United States Patent [19]
Stephenson et al.

[11] Patent Number: 6,082,548
[45] Date of Patent: Jul. 4, 2000

[54] MOBILE SOIL TREATMENT APPARATUS AND METHOD

[75] Inventors: Robert John Stephenson; Choom Jim Lim; Kok-Seng Lim, all of Vancouver, Canada

[73] Assignee: Chemtech Analysis Inc., Richmond, Canada

[21] Appl. No.: 09/043,269

[22] PCT Filed: Sep. 13, 1996

[86] PCT No.: PCT/CA96/00612

§ 371 Date: Aug. 5, 1998

§ 102(e) Date: Aug. 5, 1998

[87] PCT Pub. No.: WO97/10063

PCT Pub. Date: Mar. 20, 1997

[51] Int. Cl.[7] .............................. B03B 1/00; B03B 7/00; B01D 33/00; B08B 9/20

[52] U.S. Cl. ................................. 209/4; 209/3; 209/12.1; 209/10; 209/173; 209/17; 210/703; 210/704; 210/221.2; 210/705; 210/241; 241/20; 134/40; 134/25.1

[58] Field of Search .............................. 209/3, 4, 10, 172, 209/172.5, 173, 17, 164, 170; 210/703, 704, 221.2, 705, 241; 134/10, 40, 25.1; 241/20, 21

[56] References Cited

U.S. PATENT DOCUMENTS

| | | | |
|---|---|---|---|
| 3,819,054 | 6/1974 | Long et al. | 210/221.2 |
| 4,336,136 | 6/1982 | Giguere | 210/178 |
| 4,519,848 | 5/1985 | Underwood | 134/34 |
| 4,668,382 | 5/1987 | Jameson | 209/164 |
| 4,795,557 | 1/1989 | Bourbigot et al. | 210/221 |
| 4,950,396 | 8/1990 | Skaar et al. | 210/221.2 |
| 5,045,240 | 9/1991 | Skriba et al. | 252/626 |
| 5,055,204 | 10/1991 | Bogart | 210/758 |
| 5,115,986 | 5/1992 | Bateson et al. | 241/20 |
| 5,149,444 | 9/1992 | Hoch | 405/128 X |
| 5,158,686 | 10/1992 | Kigel | 210/713 |
| 5,193,936 | 3/1993 | Pal et al. | 405/128 |

(List continued on next page.)

FOREIGN PATENT DOCUMENTS

| | | | |
|---|---|---|---|
| 3722277 | of 0000 | Germany | B09C 1/04 |
| 0185831 | 7/1986 | Germany | B09B 5/00 |
| 0313116 | 4/1989 | Germany | B09B 5/00 |
| 0403669 | 12/1990 | Germany | B01D 11/02 |
| 4000148 | 10/1991 | Germany | A62D 3/00 |
| 4303529 | 7/1993 | Germany | A62D 3/00 |
| 4307952 | 9/1994 | Germany | A62D 3/00 |
| 4333490 | 4/1995 | Germany | B09C 1/04 |
| 0178009 | 4/1986 | Netherlands | B09B 5/00 |
| 0789397 | 12/1980 | U.S.S.R. | 210/703 |
| WO 092003386 | 5/1992 | WIPO | 210/221.2 |

OTHER PUBLICATIONS

Obradovic et al, Local and Overall Mixing Characteristics of the Gas–Liquid–Solid Air–lift Reactor, 1994, pp. 698–702.

Primary Examiner—Donald P. Walsh
Assistant Examiner—Daniel K Schlak
Attorney, Agent, or Firm—Chernoff, Vilhauer, McClung & Stenzel, LLP

[57] ABSTRACT

An apparatus for treating contaminated soil is disclosed. The apparatus includes a reactor vessel for holding a volume of water which is subdivided into a first chamber and a second chamber. The chambers are in fluid communication and are partially separated by a baffle. A soil conveyor is provided for conveying a supply of the contaminated soil to the first chamber. A gas supply directs a supply of pressurized gas into the first chamber, thereby creating a turbulent mixture of soil and water in the first chamber to effect segregation of the soil into a substantially small particle size first fraction and a substantially large particle size second fraction. The reactor vessel includes a first outlet located in a lower portion of the second chamber for withdrawing a slurry comprising the second soil fraction from the reactor vessel. The lower portion of the second chamber may be funnel-shaped to help direct the mixture of soil and water toward the first outlet.

40 Claims, 14 Drawing Sheets

U.S. PATENT DOCUMENTS

| | | | |
|---|---|---|---|
| 5,217,617 | 6/1993 | Duncan et al. | 210/620 |
| 5,227,136 | 7/1993 | Hanify et al. | 422/225 |
| 5,230,794 | 7/1993 | Heijnen et al. | 210/188 |
| 5,232,596 | 8/1993 | Castaldi | 210/603 |
| 5,242,580 | 9/1993 | Sury | 405/128 X |
| 5,256,299 | 10/1993 | Wang et al. | 210/221.2 |
| 5,262,024 | 11/1993 | Lomasney et al. | 204/157.43 |
| 5,304,710 | 4/1994 | Kigel et al. | 588/257 |
| 5,368,411 | 11/1994 | Losack | 405/258 X |
| 5,391,018 | 2/1995 | Parker | 405/128 |
| 5,392,924 | 2/1995 | Hume | 209/161 |
| 5,423,981 | 6/1995 | Krieger | 210/221.2 |
| 5,454,878 | 10/1995 | Bala et al. | 134/10 |
| 5,540,836 | 7/1996 | Coyne | 210/221.2 |
| 5,599,137 | 2/1997 | Stephenson et al. | 405/128 |
| 5,660,718 | 8/1997 | Chudacek et al. | 209/164 |
| 5,720,393 | 2/1998 | Wedel et al. | 209/13 |
| 5,720,876 | 2/1998 | Mackrele et al. | 210/197 |
| 5,829,691 | 11/1998 | Gaudin | 241/46.01 |
| 5,935,447 | 8/1999 | Forbes et al. | 210/703 |

MOBILE SOIL TREATMENT APPARATUS AND METHOD

FIELD OF THE INVENTION

This application relates to a mobile apparatus and method for treating contaminated soil. The apparatus consists of three interconnected subunits, namely a fluidized bed reactor for segregating an aqueous soil slurry based on particle size; a metals extraction unit for removing heavy metals and other contaminants from the contaminated soil fraction; and a water treatment system utilizing a high density sludge process to remove metals from the contaminated aqueous phase.

BACKGROUND OF THE INVENTION

Contaminated soil sites pose serious environmental problems. Many industrial activities are likely to result in metals contamination of soil, such as mines, smelters, foundries, metal fabricating and plating industries, cement plants, shipyards, metal recycling facilities, bulk terminals, wood treatment yards, and surface finishing (sandblasting) industries. Soil contaminated with toxic heavy metals, hydrocarbons and organics often poses a long term environmental hazard to terrestrial and aquatic organisms in the vicinity of the contaminated site. Moreover, contaminated soil reduces property values and limits the real estate development or redevelopment potential of the site. Remediation of contaminated sites is desirable to reduce or eliminate these problems.

Most heavy metal contaminants are present in soil in the relatively small particle size clay, silt, humic and organic soil fractions. The larger particle size sand and gravel fractions are usually relatively uncontaminated. Several soil treatment techniques are known in the prior art which include a segregation step for concentrating contaminants by means of particle size separation. The disadvantages to the use of mechanical separators include high energy and maintenance costs and relatively poor separation of soil fractions. Often it is necessary to initially subject the soil to grinding and screening operations. Moreover, the efficiency of segregation varies depending upon the moisture content of the soil.

German patent document 4303529 is illustrative of the prior art. This reference discloses an apparatus and procedure for the chemico-physical and bio-physical treatment of contaminated soil which includes the step of subjecting the soil particles to shear forces within a water-filled washing reactor to separate the clay and organic fraction from coarser soil particles. The shear forces are generated by mechanical drums which rotate within the washing reactor to create air-water eddies.

The applicant has determined that a more efficient means for segregating soil by particle size is by injecting a stream of compressed air directly into a fluid mixing chamber. Fluidized beds and air flotation cells for carrying out chemical and biological reactions under controlled conditions are well known in the prior art, but they are not adapted for effectively segregating raw soil particles and managing the resulting solid fractions.

Another drawback of some prior art soil treatment systems is hat they cannot be used to treat the contaminated soil in situ (i.e. at the site of contamination). Rather, the contaminated soil must be excavated and transported to the remediation site for treatment. The cleaned soil is then transported back to the excavation site. The need to transport large volumes of soil significantly increases the overall cost of the treatment process. The possibility of spillage of contaminated soil during transportation is also a concern.

The need has therefore arisen for a mobile soil treatment apparatus and method employing a fluidized bed reactor capable of segregating raw soil into contaminated and uncontaminated fractions in a continuous operation without resorting to mechanical grinders or separators.

SUMMARY OF THE INVENTION

The reactor vessel also includes a second outlet located in an upper portion of the second chamber for withdrawing the first soil fraction from the reactor vessel. The first soil fraction may be associated with a foam, especially if surfactant reagents are used. Preferably the second outlet is located above the second chamber. The second outlet may comprise a conduit which is slidably adjustable relative to the reactor vessel between different vertical positions. Alternatively, the second outlet may comprise a plurality of closable outlet ports spaced at different distances from the first chamber, slightly above the level of water in the reactor vessel.

In the preferred embodiment, the upper and lower portions of the first and second chambers are in fluid communication to permit circulation of the mixture of soil and water around the baffle. In one embodiment, a slot may be formed in a lower portion of the baffle to permit circulation of the mixture of soil and water from the second chamber to the first chamber. An adjustable gate is preferably provided for adjusting the size of the slot opening. The gate may be pivotally coupled to the baffle.

The first chamber preferably has a substantially smaller volume than the second chamber. The soil conveyor may consist of an trough which terminates proximate a lower portion of the first chamber. The gas supply is located in a lower portion of the first chamber for directing gas upwardly into the first chamber. A gas outlet may be located in an upper portion of the reactor vessel for receiving gas vented from the first chamber. Preferably, a baffle, which is inclined toward the second chamber, extends part-way across the reactor vessel between the first chamber and the gas outlet.

The gas supply may consist of a nozzle connectable to a supply of pressurized gas. Alternatively, the gas supply may consist of a windbox assembly having an inlet connectable to a supply of pressurized gas; a distribution plate having a plurality of apertures which forms the upper surface of the windbox; and a discharge port extending vertically through the windbox into the first chamber. Preferably the windbox is wedge-shaped and the distribution plate is inclined downwardly toward the discharge port.

The apparatus may further include soil segregation means connected to the first outlet of the reactor vessel for separating the second soil fraction from water and any relatively small particles present in the soil slurry. In one embodiment, the soil segregation means may comprise a hydrocyclone and a static water column. In another embodiment, the soil segregation means may comprise one or more classifiers. The water is recirculated back to the reactor vessel. The small soil particles may also be recirculated to the reactor vessel for further treatment.

The apparatus may comprise a dewatering apparatus connected to the second outlet for removing water and any foaming agents from the first soil fraction and recycling the water and foaming agents back to the reactor vessel. The dewatering apparatus yields a solid cake of the substantially small soil particles which may be conveyed to a metals extraction subunit for extracting contaminants from the first soil fraction. A water treatment subunit is connected to the dewatering apparatus for precipitating any contaminants which remain present in the water filtrate.

A method for treating soil containing contaminants is also disclosed comprising the steps of (a) introducing the soil into a reactor vessel containing a volume of water; (b) introducing a supply of pressurized gas into the reactor vessel to create a turbulent mixture of soil and water, thereby effecting segregation of the soil into a first fraction containing the contaminants which comprises small size soil particles and a second fraction which comprises substantially large size, uncontaminated soil particles; (c) withdrawing the first fraction from an upper portion of the reactor vessel; (d) withdrawing a slurry comprising the second fraction from a lower portion of the reactor vessel and; (e) separating the slurry into a third fraction comprising the large size soil particles and a fourth fraction comprising any relatively small size soil particles present in the slurry. The fourth fraction may be recycled to the reactor vessel in one embodiment of the invention.

The method may also include the step of dispersing a surfactant reagent into the reactor vessel to generate a foam comprising the first fraction. Chemical reagents to alter the pH of the soil and water mixture may also be introduced into the reactor vessel.

The soil is preferably introduced into the reactor vessel continuously and the foam and slurry are withdrawn from the reactor vessel continuously. Optionally, the mixture of soil and water may be circulated between the first and second chambers multiple times before withdrawing the slurry from the reactor vessel.

After the slurry is dewatered, the resulting water filtrate is recirculated to the reactor vessel. The water filtrate may be heated before reintroducing it into the reactor vessel. Air vented from the reactor vessel may also be captured, cleaned and recirculated.

BRIEF DESCRIPTION OF THE DRAWINGS

In drawings which illustrate the preferred embodiment of the invention, but which should not be construed as restricting the spirit or scope of the invention in any way.

DETAILED DESCRIPTION OF THE PREFERRED EMBODIMENT

This application relates to an apparatus and method for treating contaminated soil. The invention is primarily designed to remove heavy metals, hydrocarbons and organic contaminants from soil in situ in a commercially viable, cost-effective manner.

1.0 FIRST EMBODIMENT

Figure 1:
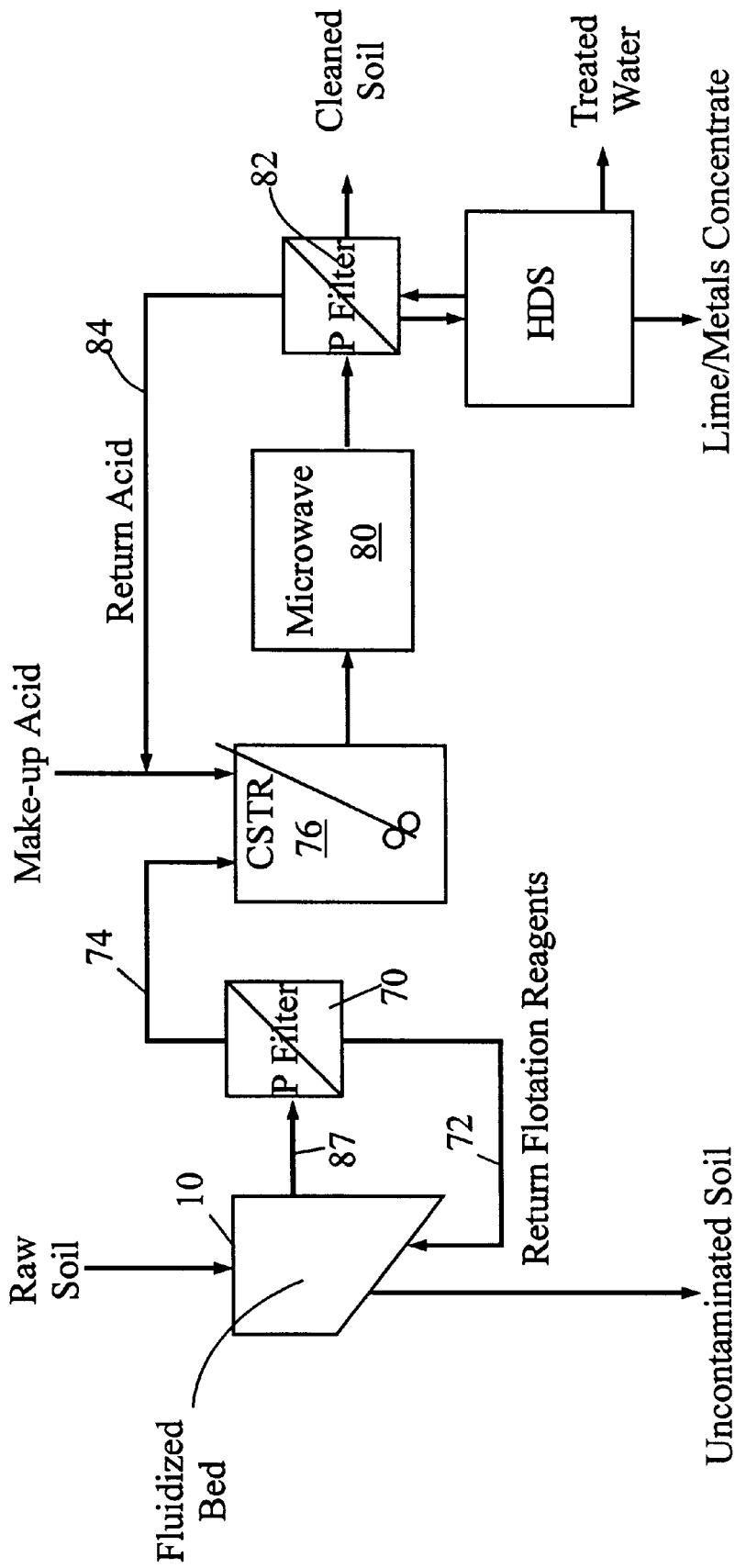
FIG. 1 is a schematic view of the applicant's overall process for treating contaminated soil.

FIG. 1 is a schematic drawing of a first embodiment of the applicant's overall apparatus and process for remediating contaminated soil. The invention consists of three interconnected subunits, namely (1) a soil segregation subunit for concentrating contaminants by means of particle size separation; (2) a metals extraction subunit for removing heavy metals and organic contaminants from the contaminated soil fraction; and (3) a water treatment subunit for removing metals from the aqueous stream.

1.1 Soil Segregation Subunit

The soil segregation subunit is designed to physically separate the contaminated soil fraction from the remainder of the raw soil. Metal contaminants tend to bind physically and chemically to organic, clay, humic and silt particles. Such particles are themselves often attached to sand and gravel. The soil segregation subunit is designed to separate the smaller particle size organic, clay, humic and silt fractions from the larger particle size sand and gravel fractions in a continuous process. This substantially reduces the volume of contaminated soil requiring treatment in the subsequent metals extraction and water treatment subunits.

Figure 5:
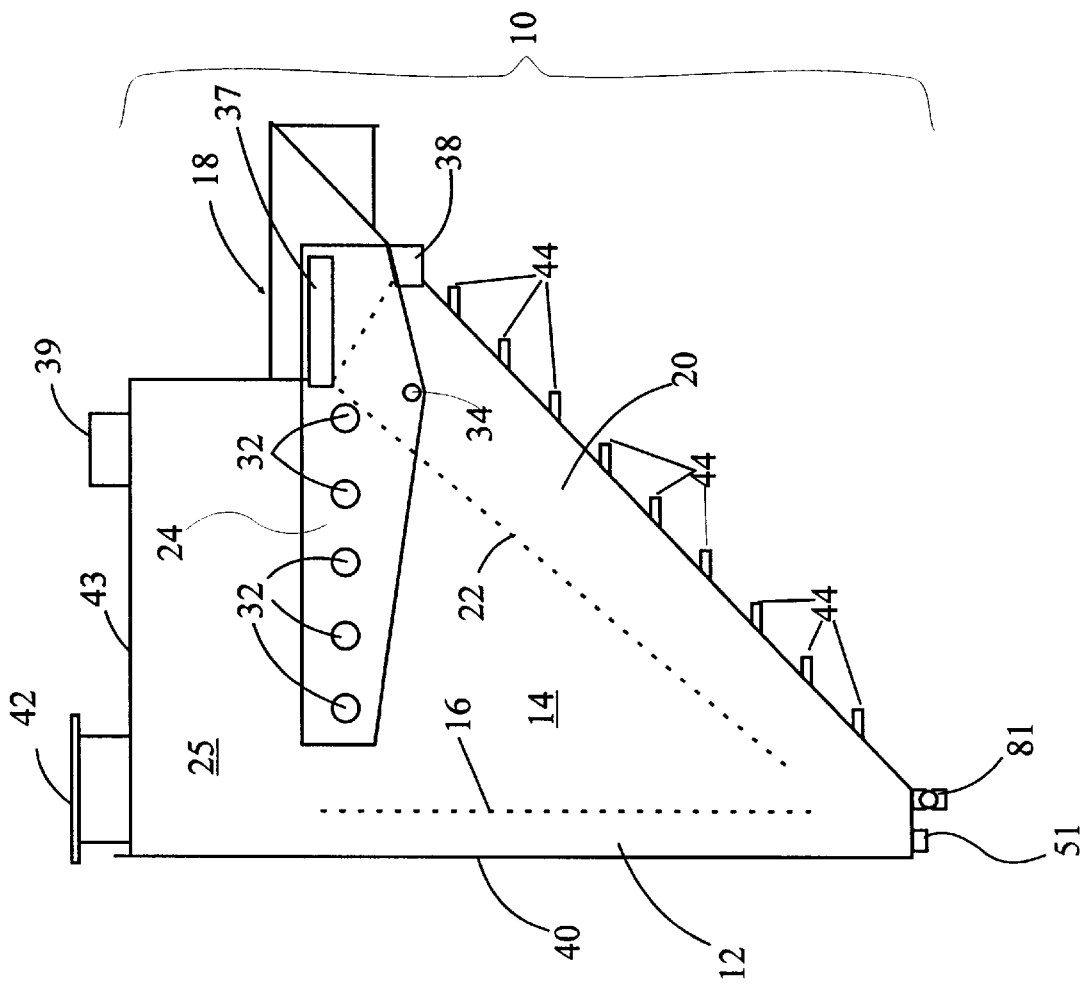
FIG. 5 is a side elevational view of the reactor of FIG. 3.

As shown in FIGS. 2–7, the applicant's soil segregation subunit comprises a fluidized bed reactor 10 for separating raw soil according to particle size. Reactor 10 has a small front mixing chamber 12 and a larger rear settling chamber 14 which are partially separated by a vertical baffle 16. The upper and lower portions of chambers 12, 14 are connected to allow water and suspended soil particles to circulate around baffle 16, improving washing efficiency (FIG. 5).

A soil inlet 18 is located at the upper, rear end of reactor 10 which continuously receives a supply of raw soil from a hopper 19. An inclined trough 20 extends downwardly and forwardly from soil inlet 18 to the bottom portion of front chamber 12. As shown best in FIGS. 4 and 5, trough 20 is separated from rear chamber 14 by an inclined panel 22.

Figure 6:
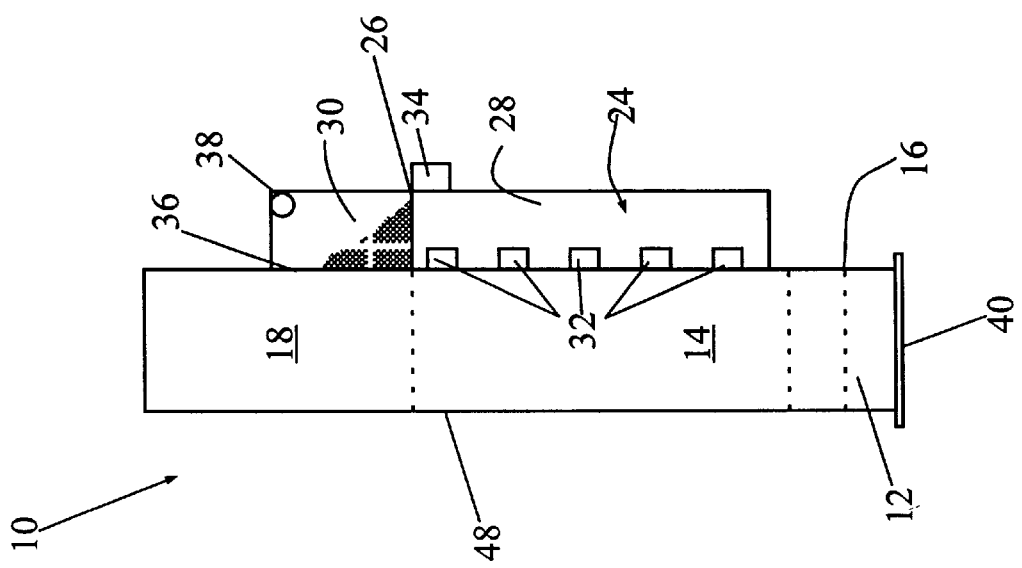
FIG. 6 is a top plan view of the reactor of FIG. 3.

An elongated collection tray 24 is mounted on a side panel 25 of reactor 10 at an upper location thereof. Collection tray 24 is subdivided by a wall 26 into a front receptacle 28 and a rear receptacle 30 (FIG. 6). As discussed further below, a plurality of spaced-apart, adjustable outlet ports 32 are formed in side panel 25 to allow foam to overflow from reactor rear chamber 14 into the front receptacle 28 of collection tray 24. A single discharge port 34 is provided for connecting tray front receptacle 28 to the metals extraction subunit described further below.

The collection tray rear receptacle 30 is separated from soil inlet 18 by a divider 36 having a slot 37 formed therein. As discussed further below, floating debris present in the raw soil inflow, such as bark, shells, plastic fragments and other floatable debris, passes through slot 37 into rear receptacle 30. A single vertical outlet port 38 is provided for discharging such debris to waste (FIG. 5).

In the illustrated embodiment, the front end of reactor 10 is covered with a clear plexiglass cover 40 to enable visual monitoring of mixing operations. A plexiglass viewing port 42 is also mounted on the top panel 43 of reactor 10 at the front end. A gas vent 39 is located near the rear end of top panel 43 (FIGS. 5 and 7).

A series of spaced-apart water/air inlet ports 44 are mounted on the rear panel 45 of fluidized bed reactor 10 in communication with inclined trough 20 (FIG. 5). As discussed further below, inlet ports 44 may be selectively connected to water and/or air supplies.

Figure 2:
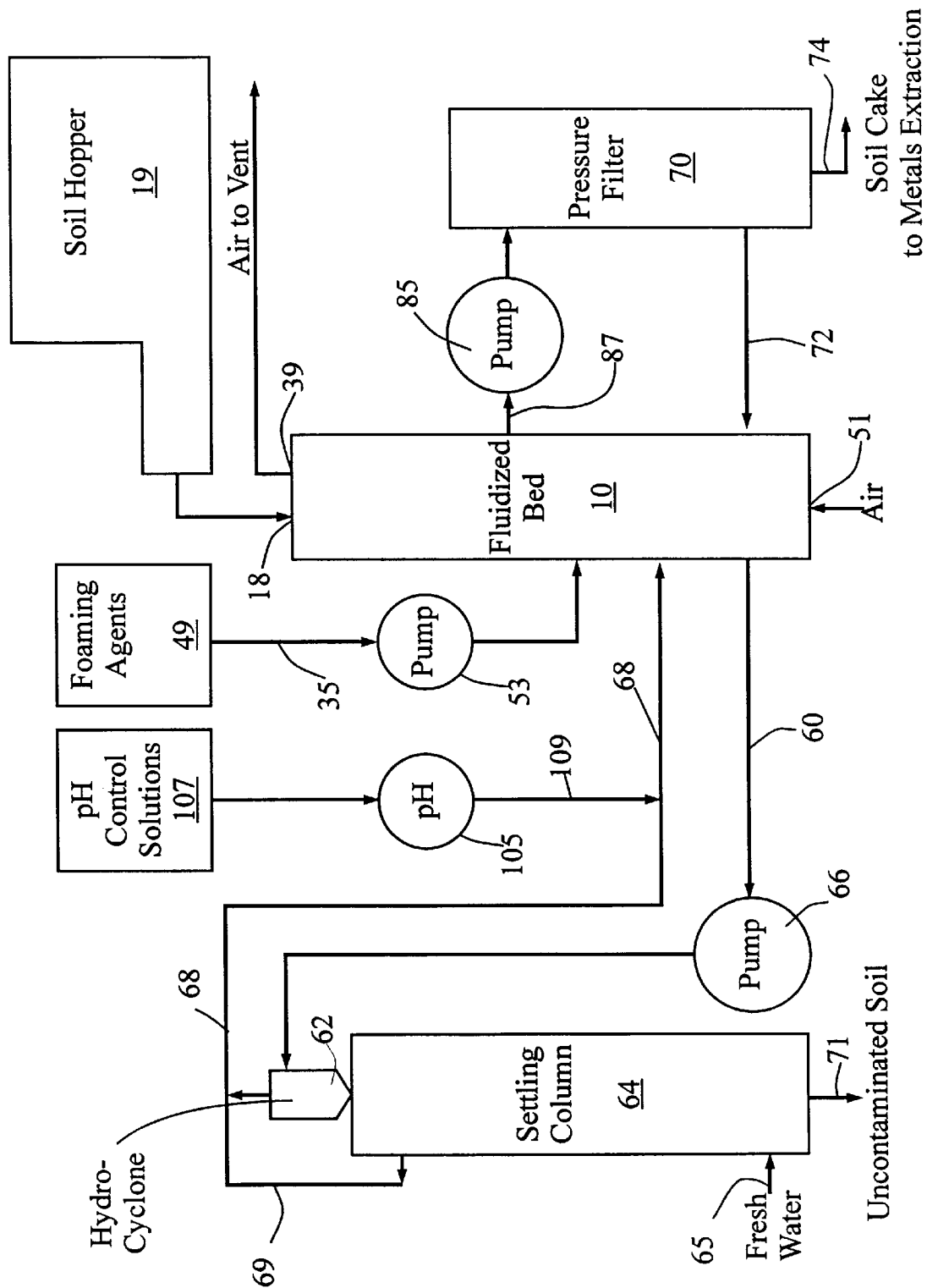
FIG. 2(a) is a schematic view of the soil segregation subunit.
FIG. 2(b) is a detailed schematic view of the soil segregation subunit.
Figure 2:
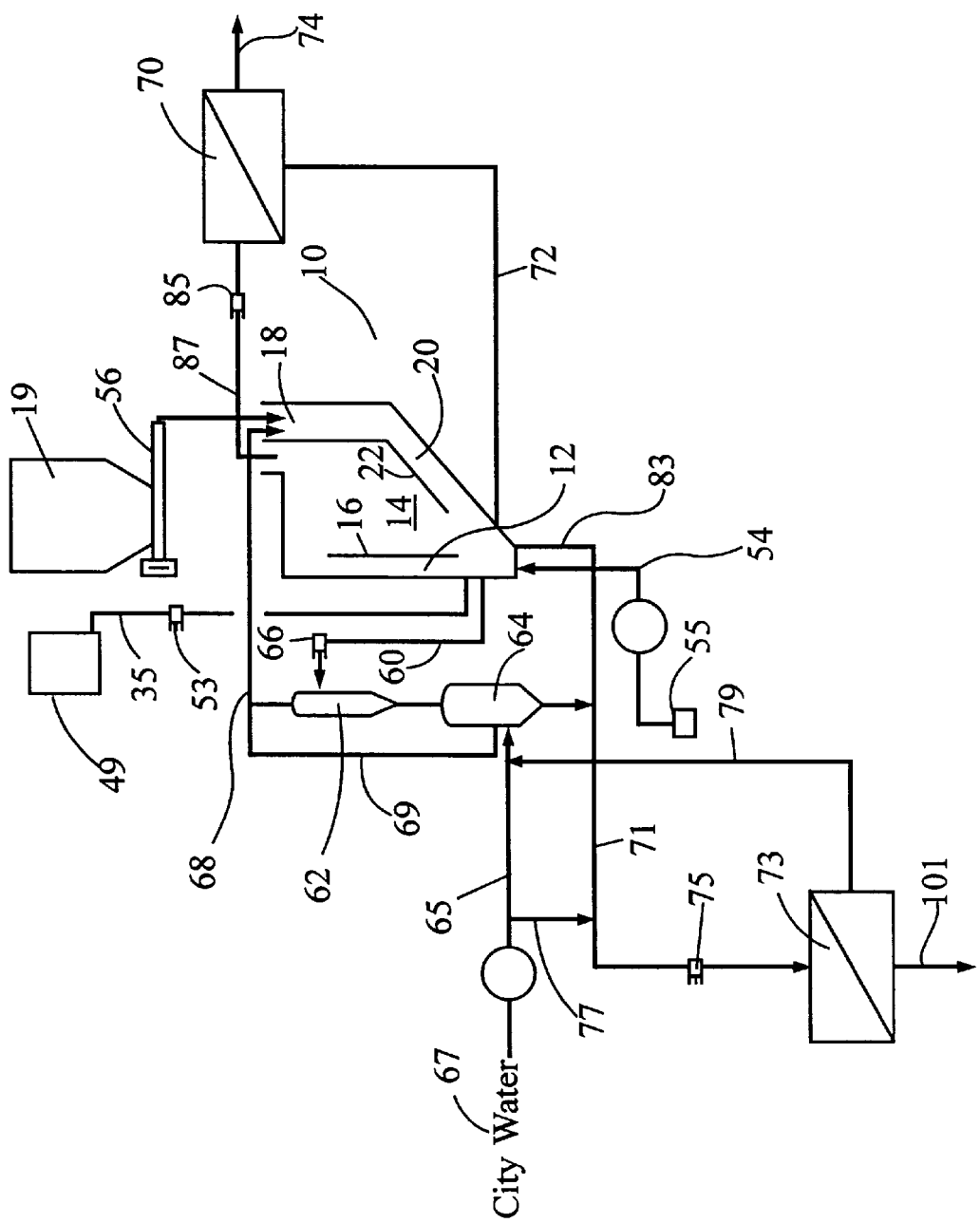
Figure 3:
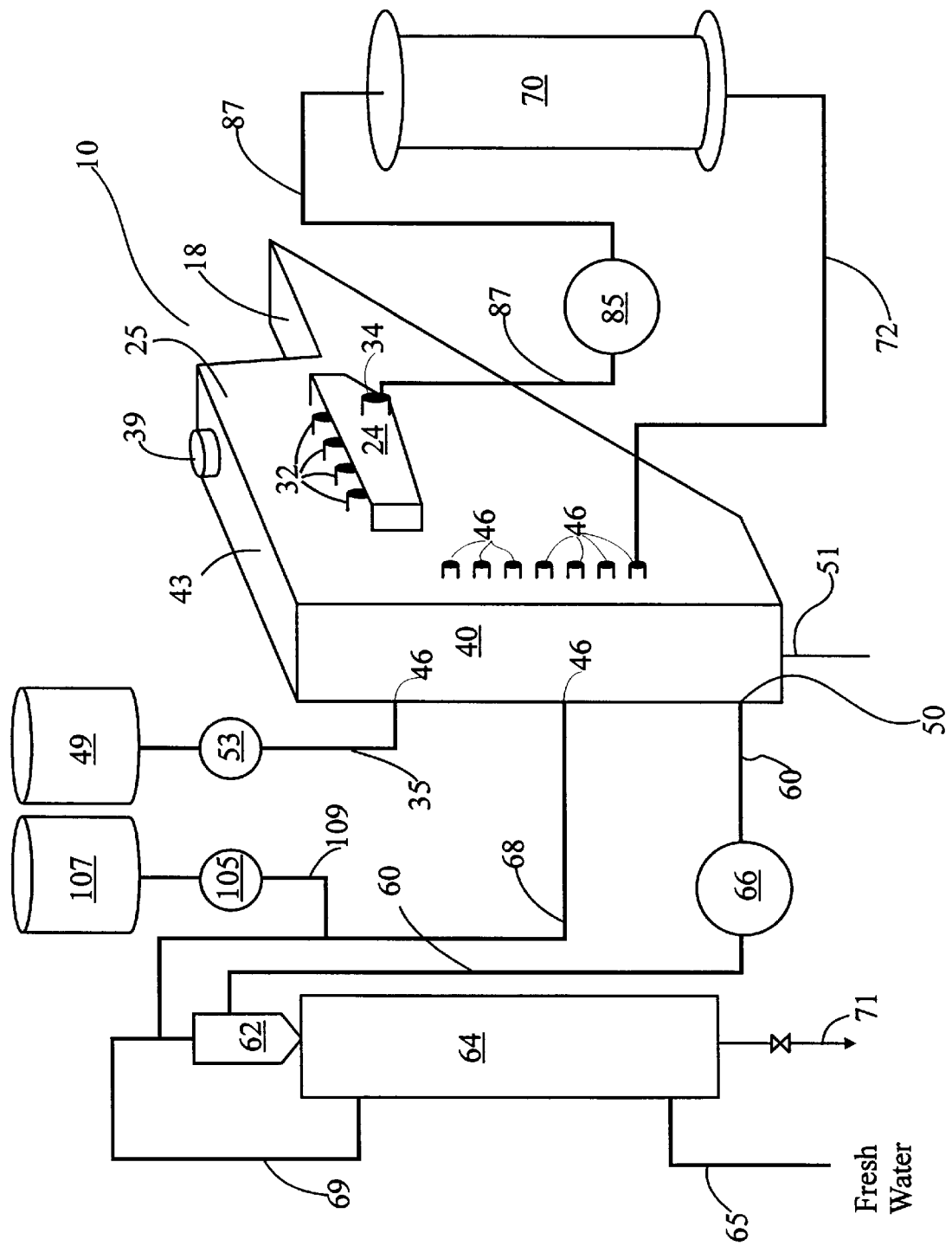
FIG. 3 is an isometric view of the fluidized bed reactor connected to a hydrocylone and static column solids trap.
Figure 4:
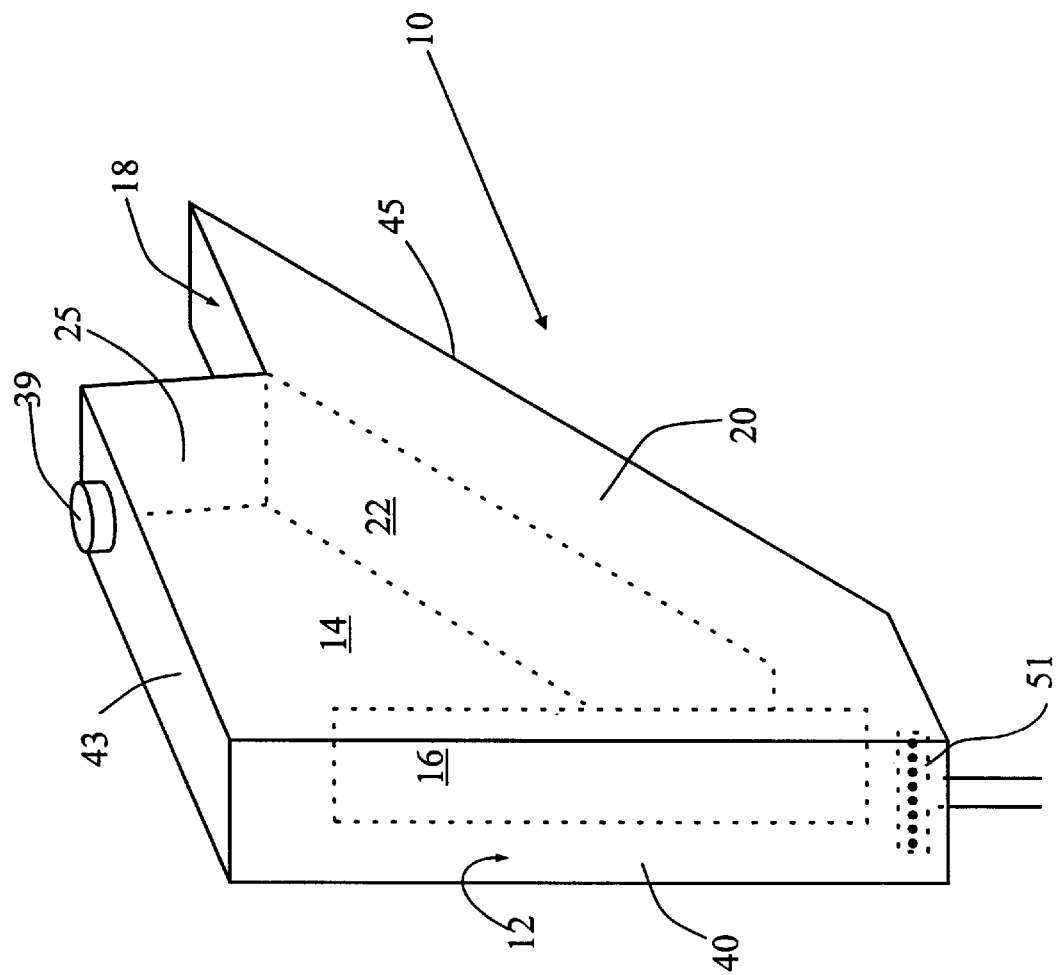
FIG. 4 is a cut-away view of the reactor of FIG. 3 showing the internal baffle.
Figure 7:
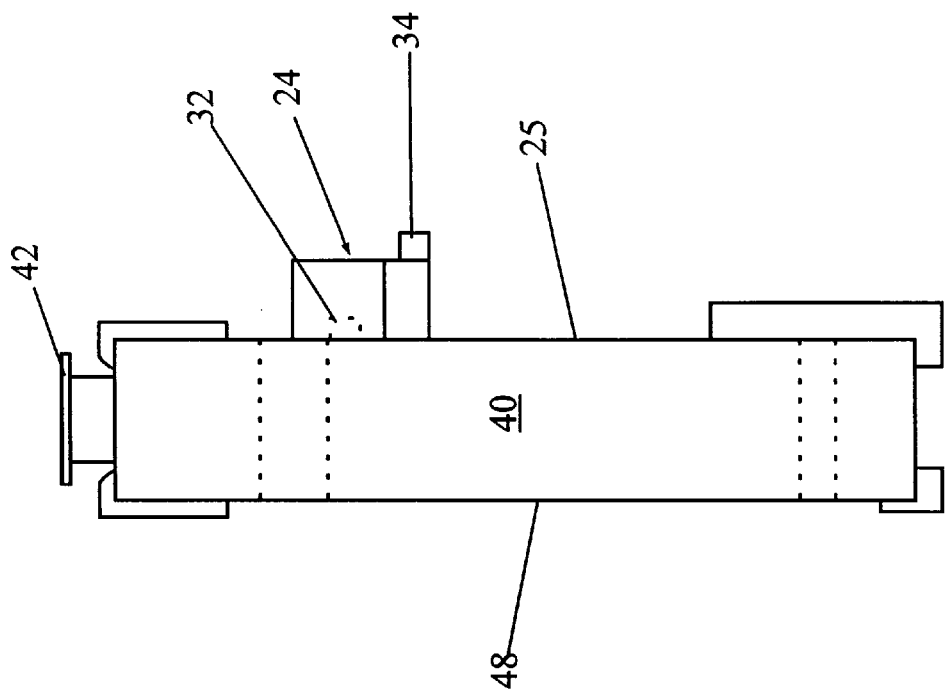
FIG. 7 is a front elevational view of the reactor of FIG. 3.

A series of spaced-apart reagent inlets 46 are located on a side panel 25 and/or 48 of reactor 10 at the front end thereof (FIGS. 3 and 7). Reagent inlets 46 are in communication with the front mixing chamber 12 of fluidized bed reactor 10. As shown schematically in FIGS. 2(a) and 2(b), chemical reagents, such as a supply 49 of foaming agent, may be conveyed through a conduit 35 via a chemical metering pump 53 to a selected reagent inlet 46.

A series of spaced-apart soil slurry outlets 50 are also located on side panel 48 near the front end of reactor 10 (FIGS. 3 and 7). Soil slurry outlets 50 are in fluid communication with a bottom, forward portion of rear chamber 14.

An air injection nozzle 51 is located at the bottom, front end of reactor 10 (FIG. 5). Nozzle 51 is connected via conduit 54 to a compressed air supply or blower 55 (FIG. 2(b)). Nozzle 51 includes an air distributor for directing a stream of pressurized air upwardly into the front chamber 12 of fluidized bed reactor 10 to create a turbulent mixture of raw soil and water within reactor 10. The surfaces of the soil particles are scoured by this turbulent mixing.

The soil segregation unit also includes a hydrocyclone 62 mounted on a static water column (i.e. solids trap) 64 separate from fluidized bed reactor 10 (FIGS. 2(a), 2(b) and 3). A solids pump 66 is provided for pumping the soil slurry discharged from an outlet 50 through a conduit 60 to hydrocyclone 62. Hydrocyclone 62 separates the incoming slurry into a water stream and a granular soil fraction by centrifugal force. The water stream, and any water-borne foaming agents, are continuously recycled from hydrocylone 62 back to reactor 10 through a conduit 68. The water stream is either discharged from conduit 68 directly into soil inlet 18, or may be connected to a water/air inlet 44 or a reagent inlet 46.

Solutions for controlling the pH of the water stream recycled to fluidized bed reactor 10 may optionally be introduced into conduit 68 as shown in FIG. 3. A pump 105 is provided for discharging the solutions from a supply 107 through a conduit 109. By way of example, the pH control solutions may comprise caustic (sodium hydroxide) for enhancing the action of foaming agents or other reagents. The pH control solutions may be added to increase the solubility of specific soil contaminants such as hydrocarbons.

The granular soil fraction is discharged from hydrocyclone 62 into static water column 64. Column 64 is connected via a conduit 65 to a water supply 67, such as a local water line. Relatively large, uncontaminated soil particles gradually settle at the bottom of column 64 against an upward flow of percolating water. The smaller, fine soil particles, which may contain contaminants, are concentrated in an upper portion of column 64 by the up-welling water. The fines are recycled back to reactor 10 for further processing through a conduit 69 which merges with the water stream discharged into conduit 68 (FIGS. 2(a) and 2(b)).

The relatively large, uncontaminated soil particles which settle at the bottom of column 64 are discharged through a conduit 71 to a first pressure filter 73 by means of a pump 75 (FIG. 2(b)). A stream of wash water from water supply 67 may be added to conduit 69 via a conduit 77. The uncontaminated soil particles are de-watered in filter 73 and are returned to the excavation site through a flow line 101. The wash water is returned to static column 64 via a conduit 79.

Fluidized bed reactor 10 also includes an outlet valve 81 for periodically draining very heavy soil particles or other uncontaminated debris which settle at the bottom of reactor 10 (FIG. 5). When valve 81 is opened, such uncontaminated soil and debris drain into conduit 83 which merges into conduit 71 (FIG. 2(b)).

In operation, fluidized bed reactor 10 is filled with water to a level approximately even with the bottom of outlet ports 32. Raw contaminated soil is introduced into soil inlet 18 in a continuous stream. For example, excavated raw soil may be initially dumped into hopper 19. Hopper 19 is fitted with a screw auger 56 to discharge the raw soil at a controlled rate into inlet 18 (FIG. 2(b)).

The raw soil slurry passes from inlet 18 down inclined trough 20 to the front, bottom portion of reactor 10 by gravitational forces. Makeup water from conduit 68 may be introduced into trough 20 through one or more inlet ports 44 to assist in propelling the soil slurry downwardly.

Compressed air may also be blown through one or more inlet ports 44 to help buoy any floatable debris present in the raw soil. The buoyed debris floats through slot 37 formed in divider 36 into the rear receptacle 30 of collection tray 24, and thereafter passes through outlet 38 to waste. This initial separation of non-soil debris, such as shells, plastic fragments, bark and the like from the material inlet stream substantially reduces downstream consumption of acidic reagents.

The upward stream of compressed air injected through nozzle 51 into front mixing chamber 12 creates a vacuum which draws the soil slurry from the forward end of trough 20 into chamber 12. The compressed air stream causes very turbulent mixing of the soil slurry in front chamber 12 which scours the surfaces of the soil particles. The scoured soil separates into a clay and silt fraction, ordinarily containing the majority of heavy metal, hydrocarbon and organic contaminants, and a relatively uncontaminated, heavier soil fraction comprising larger sand and grit particles.

Foaming agents or other chemical reagents may be dispersed into front chamber 12 through one or more of the inlets 46 (FIG. 3). The association of the foaming agents with the clay and silt fractions causes them to become hydrophobic which enhances the separation efficiency. Most foaming agents include separate reagents designed to cause frothing and to stabilize the foam for collection. As should be apparent to someone skilled in the art, the selection of foaming agents will depend on the type of soil to be treated. For example, a combination of DOWFROTH 250™ (frothing reagent) and pine oil (collection/stabilization reagent) has been shown to exhibit high specificity to clay soil fractions (which typically contain heavy metals). Oily reagents such as pine oil or kerosene readily adsorb to many organic particles.

The smaller clay and organic particles (i.e. the "first soil fraction") become suspended in the foam and float primarily in the upper portion of reactor rear chamber 14. The heavy sand and grit particles (the "second soil fraction") circulate around the upper end of baffle 16 and descend into the lower portion of rear chamber 14. The second soil fraction may be drawn back into front chamber 12 for further mixing, or may be discharged through one or more of the soil slurry outlets 50 into conduit 60 (FIG. 3). This prevents excess accumulation of the second soil fraction at the bottom of the fluidized bed reactor 10.

Reactor 10 thus functions as a hybrid between a fluidized bed and an air flotation cell. The fluidized bed aspect offers excellent mixing characteristics which serve to scour the soil and remove organic and clay fractions from the sand and grit matrix. The air flotation aspect of the segregation system is related to the use of foaming agents in order to float and remove the contaminants in a continuous operation.

As discussed above, conduit 60 is connected to a hydrocyclone 62 mounted on a static water column 64 separate from fluidized bed reactor 10. Solids pump 66 is provided for pumping the soil slurry discharged from reactor 10 to hydrocyclone 62. The hydrocyclone 62 separates the solid and liquid phases of the soil slurry containing the second soil fraction and continuously recycles the liquid phase, which may contain foaming agents, through conduit 68 back to fluidized bed reactor 10. The heavier soil particles which settle in column 64 are discharged to first pressure filter 73 for dewatering and return to the excavation site.

The smaller, fine soil particles, which may contain contaminants, are concentrated in an upper portion of column 64 by the upwelling flow of water. Such smaller, fine soil particles are returned to reactor 10 via conduit 69 for further treatment. The smaller, potentially contaminated, soil particles may be circulated between reactor 10 and static column 64 several times before they adsorb sufficient foaming agent to float within reactor rear chamber 1, ultimately to be discharged through outlet ports 32.

The contaminated clay and organic fraction suspended in the floating foam overflows from rear chamber 14 through outlet ports 32 into the front receptacle 28 of collection tray 24. The number of outlet ports 32 which need be opened depends upon the stability and volume of the foam containing the contaminated soil fraction.

Foam collected in tray 24 is discharged through port 34 into a conduit 87 and is propelled by means of a pump 85 to a second pressure filter 70. Filter 70 concentrates the contaminated soil fraction into a solid cake and recycles water and foaming agents present in the foam discharge back to the fluidized bed reactor 10 through a conduit 72 for reuse (FIG. 3). Conduit 72 may discharge directly into soil inlet 18 of reactor 10, or may be connected to a water/air inlet 44 or a reagent inlet 46.

The solid cake of contaminated soil is next conveyed to the metals extraction subunit of the applicant's soil treatment system for further processing. Approximately 10% of the soil initially introduced into fluidized bed reactor 10 ultimately passes to the next stage of the treatment process (the amount varies depending upon the makeup of the soil).

1.2 Metals Extraction Subunit

Figure 8:
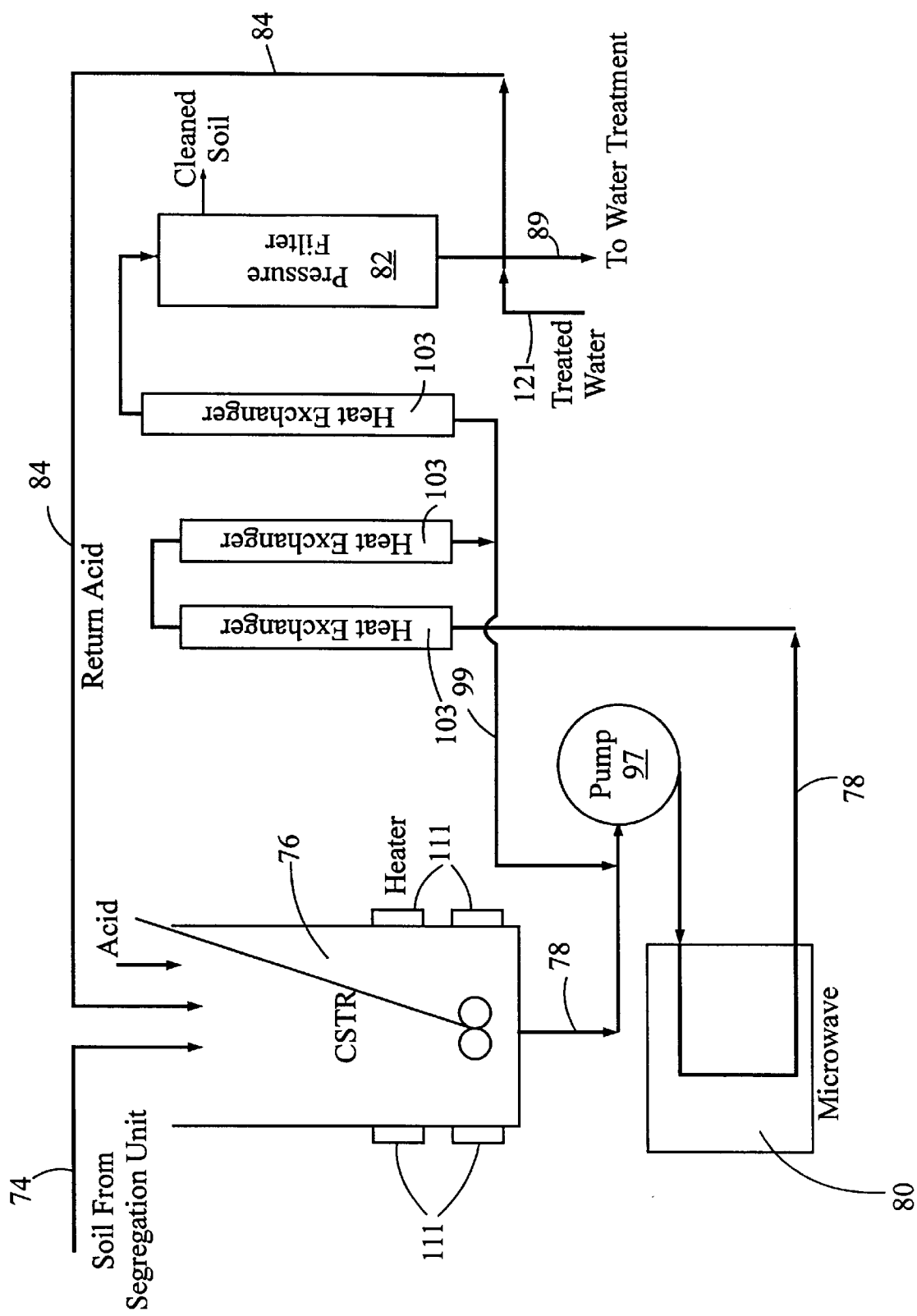
FIG. 8 is a detailed schematic view of the metals extraction subunit.

As shown schematically in FIG. 8, the metals extraction subunit consists of a series of treatment steps for extracting heavy metals and other contaminants from the first soil fraction (containing foamed clay and organics) discharged from fluidized bed reactor 10.

The solid cake formed in the soil segregation subunit is conveyed from second pressure filter 70 through a conduit 74 to one or more continuously stirred tank reactors 76 where the soil particles are subjected to acid treatment. Reactor 76 includes heaters 111 to increase reaction rates. Concentrated acid, such as 10–35% HCl, is added to reactor 76 in controlled amounts. The acid is conveyed from an acid supply through a conduit into reactor 76 by means of a pump (not shown). The rate of mixing in the reactor 76 is set to control the solids residence time to achieve a target metal removal efficiency. Ten minutes is a typical solids residence time.

Each reactor 76 acts essentially as a leach tank. Under acidic conditions, metals are usually far more mobile than under neutral or alkaline conditions. This is due to the compounding effect of several factors. Most metals dissolve under acidic conditions and some cation exchange sites have pH dependent charges, with the net result that there are fewer exchange sites at low pH. Moreover, the solubility of metallic complexes of organic matter changes with pH. Thus, reducing the pH of the contaminated soil fraction within the reactor 76 has the net effect of making most metal species more readily removable from associated soil particles.

In the illustrated embodiment, the soil slurry is subjected to a two step heating and mixing operation in the metals extraction subunit. In the first stage the soil slurry is mixed with acid in reactor 76 as discussed above and heated to approximately 60° C. such that vapour emitted from the warm acid is not problematic. The second stage is to increase the temperature of the acid slurry in a heating circuit which may comprise a conventional flow-through microwave oven 80 and a series of heat exchangers 103. The combination of reactor 76 and the heating circuit effectively constitutes a mixed reactor vessel.

As shown in FIG. 8, the soil is conveyed by means of a pump 97 from reactor 76 through a conduit 78 which passes through the reaction cavity of microwave oven 80. Microwave oven 80 is modified to include shielded inlets and outlets. Dissociating wave energy, such as microwave energy, has been shown to effect or enhance the desorption of many ionic species from a soil matrix. Microwave energy appears to be particularly effective in desorbing metal and heavy metal ions from clay soil particles.

The flow rate is preferably set so that the acidified soil particles are resident within the microwave reaction cavity for approximately one minute. During this period the soil particles are subjected continuously to microwave energy.

Following microwave degradation, the soil slurry passes through a series of heat exchangers 103. The temperature of the soil slurry in the heating circuit is raised to approximately 100° C. or more in order to enhance metals extraction. The acidified soil slurry may pass through the heating circuit several times. In the embodiment illustrated in FIG. 8, the soil slurry may pass from the second heat exchanger 103 through a flow line 99 to join the conduit 78 which passes through microwave 80. Thus the soil may be subjected to several cycles of microwave degradation.

The acidified soil slurry is periodically, discharged from the heating circuit to a third heat exchanger which is provided reduce the temperature of the slurry and thereby reduce the emission of hot acid vapour (FIG. 8). The slurry is then conveyed to a third pressure filter 82 where the slurry is dewatered by filtration and the metals laden acid stream (i.e. effluent) is split. Part of the acid stream is recycled back to reactor 76 through conduit 84. The remainder of the acid stream passes to the water treatment subunit described below. Recycling a portion of the acid reagent reduces the cost of the metal extraction process and also reduces the volume of lime required in the water treatment process.

The soil cake which remains in pressure filter 82 comprises approximately equal portions of solid soil particles and the metals laden acid stream. The soil cake is washed by periodically backwashing filter 82 with treated water (derived from the water treatment subunit described further below). Backwashing is necessary to dilute the contamination to ensure that the cleaned soil is suitable for discharge. The cleaned, remediated soil particles are periodically discharged from filter 82 to the excavation site.

As shown in FIG. 8, that portion of the contaminated, metals-laden effluent which is not recycled is pumped from filter 82 through a conduit 89 to the water treatment subunit for further processing.

1.3 Water Treatment Subunit

Upon extracting the heavy metals (or other contaminants) from the soil, the contamination problem is shifted from the solid to the aqueous phase. The water treatment subunit is designed to remove the metals from solution. The water treatment subunit employs a high density sludge (HDS) process developed in part by Corninco Engineering Services Ltd. of Vancouver, Canada and Tetra Technologies of Houston, Tex. The purpose of the HDS process is to increase the pH of the effluent solution in a step-wise process by the addition of calcium hydroxide (lime) under aerobic conditions to precipitate the metal contaminants from solution.

Figure 9:
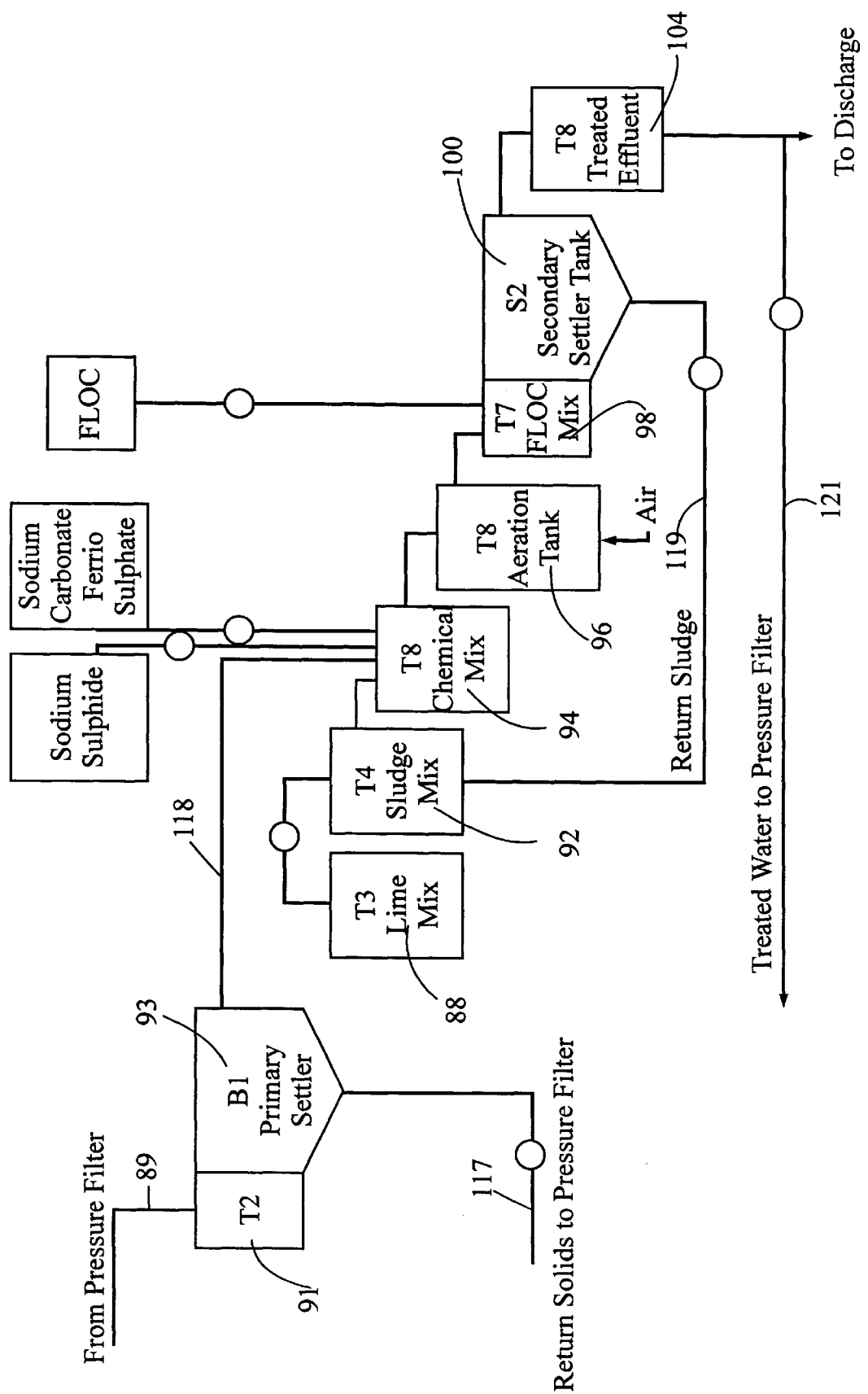
FIG. 9 is a detailed schematic view of the water treatment subunit.

The water treatment subunit is illustrated schematically in FIG. 9. The effluent discharged from pressure filter 82 passes through a conduit 89 to a holding tank 91. The effluent is then treated in a primary settling tank or clarifier 93. Any fine soil particles present in the effluent stream are settled in tank 93 and recycled to pressure filter 82 through flow line 117.

A combination of lime from a tank 88 and recycled sludge is added to a sludge-lime mix tank 92 at the head of the effluent treatment process. The metals-containing supernatant from primary settling tank 93 is conveyed through a conduit 118 and added to this slurry in a rapid mix tank 94 to result in a pH of 9.0 to 9.5. Most metals precipitate at or below this concentration of hydroxide ions. This elevated pH is also required for ferrous iron oxidation. Sodium sulphide, sodium carbonate and ferric sulphate reagents may also be added to mix tank 94 as shown in FIG. 9.

The effluent is next treated in a main lime reactor 96. High rate aeration under turbulent conditions in the main lime reactor 96 helps to promote rapid reaction rates and to oxidize iron. Flocculant is added in tank 98 to facilitate rapid settling of the particles. Clarification occurs in secondary settling tank 100. The sludge produced from treating the metals extraction effluent using the HDS process settles well and is easily dewatered. A portion of the sludge is recycled back through flow line 119 to the sludge-lime mix tank 92 at the head of the effluent treatment process and the remainder is wasted to a sludge tank (not shown).

The effective removal of metals in the HDS process is due to metal precipitates and co-precipitates of iron on the surface of the recycled particles. High iron to total metals favours the stability of the precipitates.

The metals laden sludge may be treated further using metal reclamation processes, or may be transported to a secure landfill for disposal. The volume of sludge produced by the applicant's process is very small relative to the volume of contaminated raw soil treated. The volume of lime/metal sludge produced by the process is typically between 0.3–2.0% by weight of the total raw soil treated.

The clear supernatant is pumped from secondary settling tank 100 to a holding tank 104 and optionally to an activated carbon column (not shown). The treated water is then returned to the third pressure filter 82 through conduit 121 to rinse the acidified soil slurry discharged from the heating circuit following microwave degradation as shown in FIGS. 8 and 9. A portion of the treated water may also be discharged to waste or returned to the fluidized bed reactor 10 for further processing.

Figure 10:
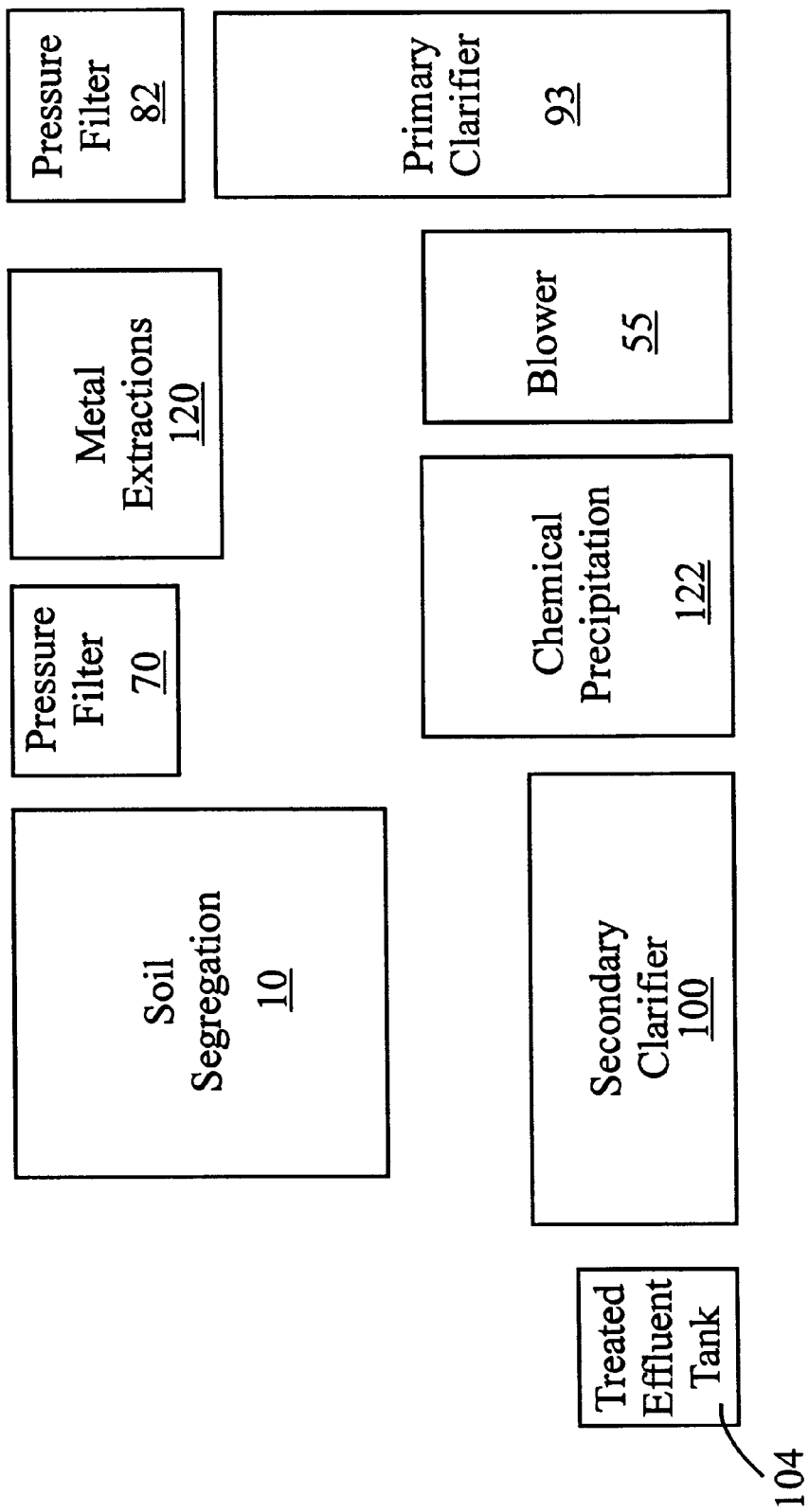
FIG. 10 is a schematic plan view illustrating the overall layout of the applicant's mobile soil treatment apparatus installed on a trailer.

The applicant's soil treatment apparatus, including the soil segregation, metal extraction and water treatment subunits, has been designed in a modular fashion so it may be readily assembled on a trailer or other vehicle for transport to soil contamination sites accessible by road (FIG. 10). The apparatus could also be installed on a barge to assist in remediating dredged sediments in a cost-effective manner. The metals extraction component 120 shown in FIG. 10 comprises the reactor 76, microwave oven 80, pump 97, heat exchangers 103 and associated flow lines discussed above. The blower 55 provides a supply of pressurized air to nozzle 51 of fluidized bed reactor 10 and aeration tank 96 of the water treatment subunit. Component 122 refers to the interconnected tanks 88, 92, 94, and 96 of the water treatment subunit shown in FIG. 9 for precipitating contaminants present in the effluent stream.

As will be apparent to those skilled in the art in the light of the foregoing disclosure, many alterations and modifications are possible in the practice of this invention without departing from the spirit or scope thereof. The applicant's fluidized bed reactor could be adapted for removing contaminants from soil other than heavy metals, such as hydrocarbons or polychlorinated biphenyls (PCBs). For example, heated steam vapour could be injected through nozzle 51 into front mixing chamber 12 in order to increase the solubility of hydrocarbons. Alternatively, a heater (not shown) could be placed on return line 72 for heating the water and foaming agents recycled from second pressure filter 70.

In another alternative embodiment, other chemical reagents, such as hydrogen peroxide, could be introduced into the front mixing chamber 12 through one of the reagent inlets 46. Hydrogen peroxide is effective in converting mercury contaminants, which are often present in soil in different valence states, to mercury oxide. This mercury oxide may be separated by using elutriation or flotation. Hydrogen peroxide also has the benefit of oxidizing many organic contaminants.

2.0 ALTERNATIVE EMBODIMENT 2.1 Primary Soil Segregation

Figure 11:
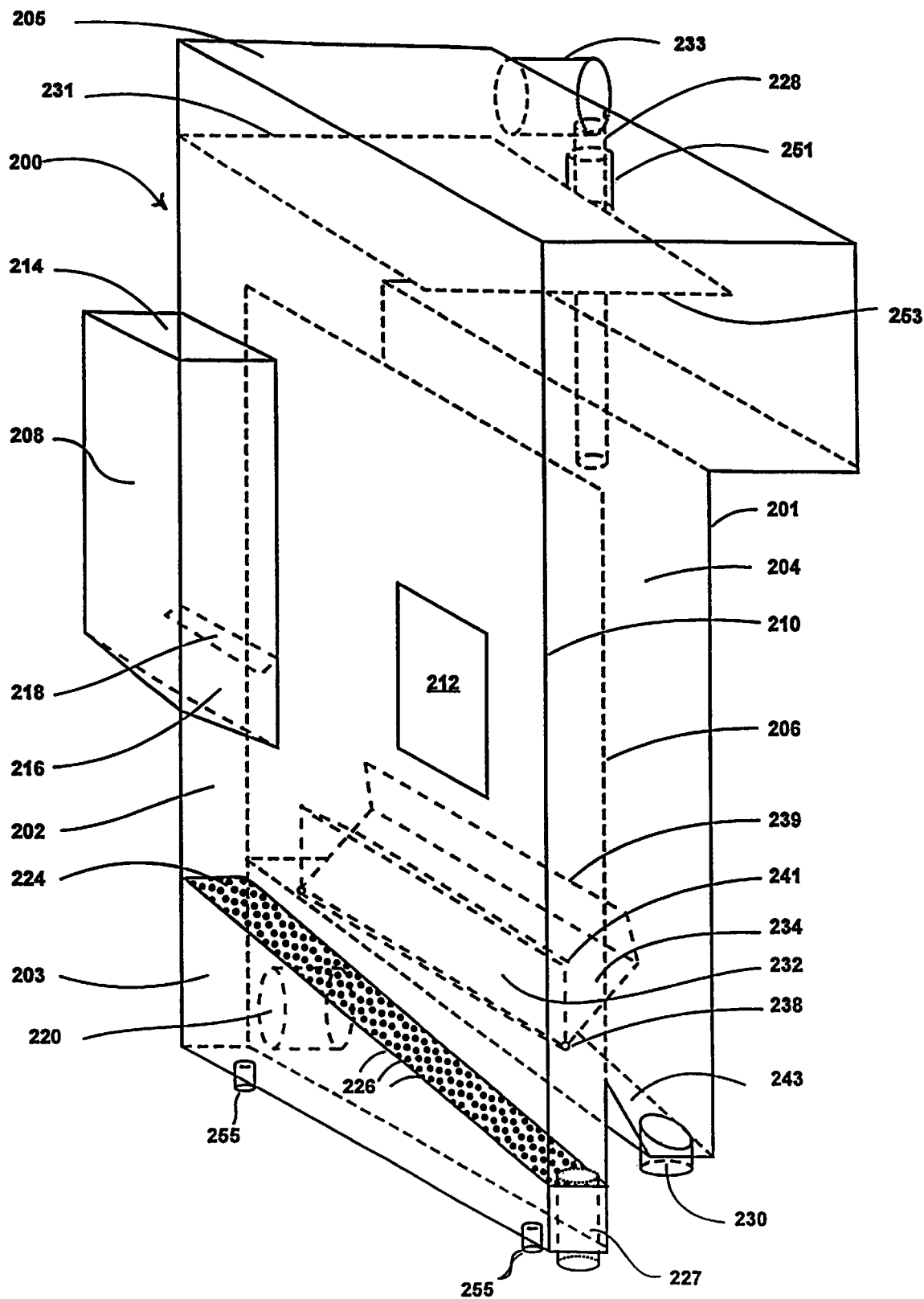
FIG. 11 is an isometric view of an alternative embodiment of the applicant's fluidized bed reactor.

FIG. 11 illustrates an alternative embodiment of the applicant's soil segregation subunit comprising a modified fluidized bed reactor 200 for separating raw soil according to particle size. Reactor 200 includes three separate modules, namely a main body 201; a windbox 203 mounted at the lower end of main body 201; and a headbox 205 mounted at the upper end of main body 201. Windbox 203 and headbox 205 may be readily disassembled from main body 201 for ease of cleaning, transport and storage of reactor 200. Reactor 200 is preferably constructed from stainless steel.

Like the first embodiment of the soil segregation subunit illustrated in FIGS. 2–7, the main body 201 of reactor 200 includes a relatively small volume front mixing chamber 202 and a relatively large volume rear disengagement or downcomer chamber 204 which are partially separated by a vertical baffle 206. The upper and lower portions of chambers 202, 204 are ordinarily in fluid communication to allow water and suspended soil particles to circulate around baffle 206.

Figure 12:
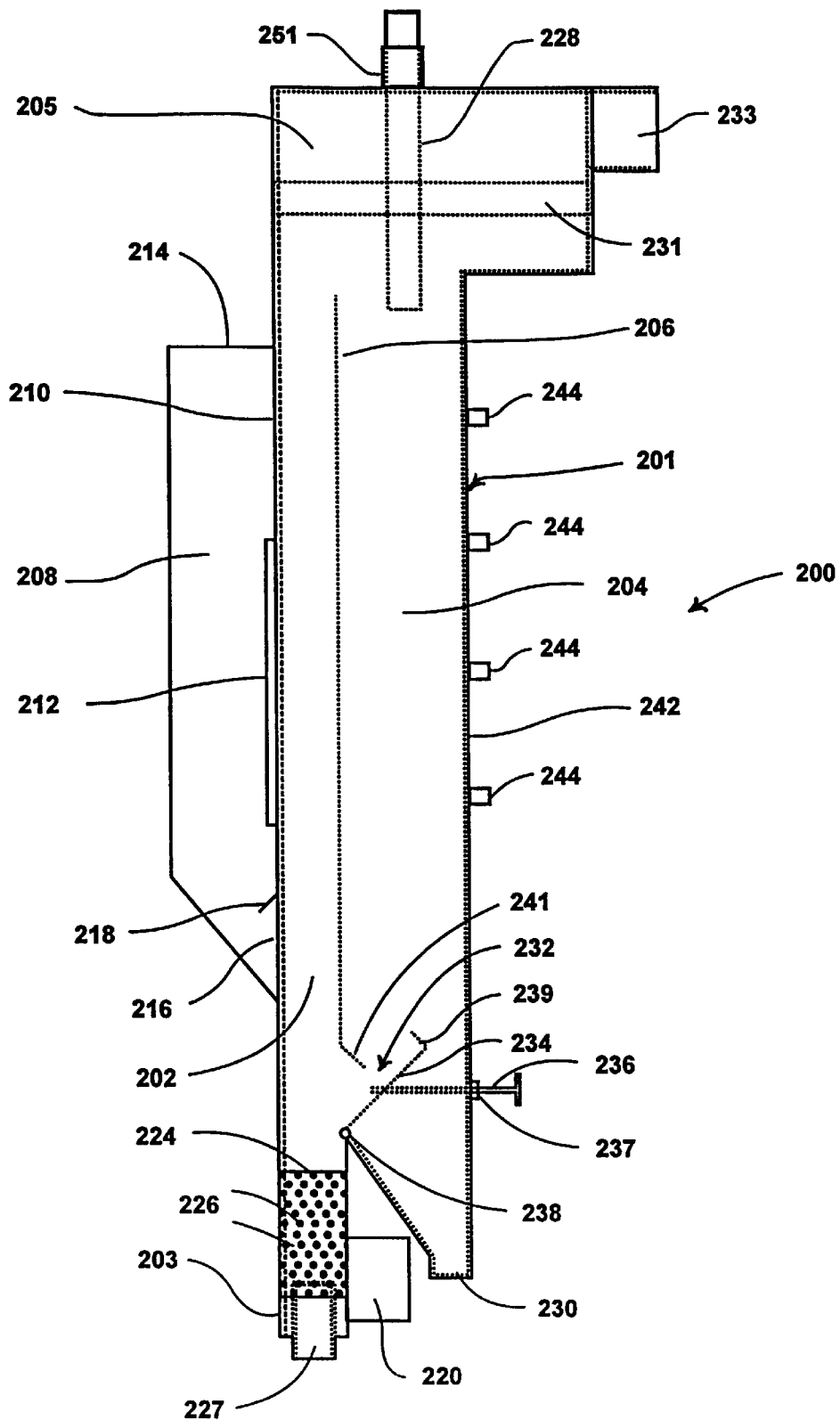
FIG. 12 is a side elevational view of the reactor of FIG. 11.

A vertical soil inlet trough or feed sluice 208 is located adjacent mixing chamber 202 and is separated therefrom by a panel 210. Panel 210 may have a viewing window 212 mounted therein to permit operators to monitor soil mixing efficiency. Trough 208 has an inlet 214 at its upper end for continuously receiving soil from a hopper (not shown); and an outlet 216 at its lower en empties into a lower portion of mixing chamber 202. Panel 210 has a short inclined skirt 218 at its lowermost end to help prevent air rising in mixing chamber 202 from entering soil inlet trough 208 (FIG. 12).

Contaminated soil is introduced into reactor 200 through trough inlet 214 together with a supply of heated water to form a soil slurry. In some cases the feed soil may be pre-screened. Surfactants and other chemical reagents may also be introduced into reactor 200 through inlet 214 in addition to the feed soil. For example, reagents for controlling pH and foaming of contaminants could be added to the soil slurry through trough 208. Preferably such reagents would be introduced into reactor 200 in pellet form to avoid altering the water balance of the system.

Figure 14:
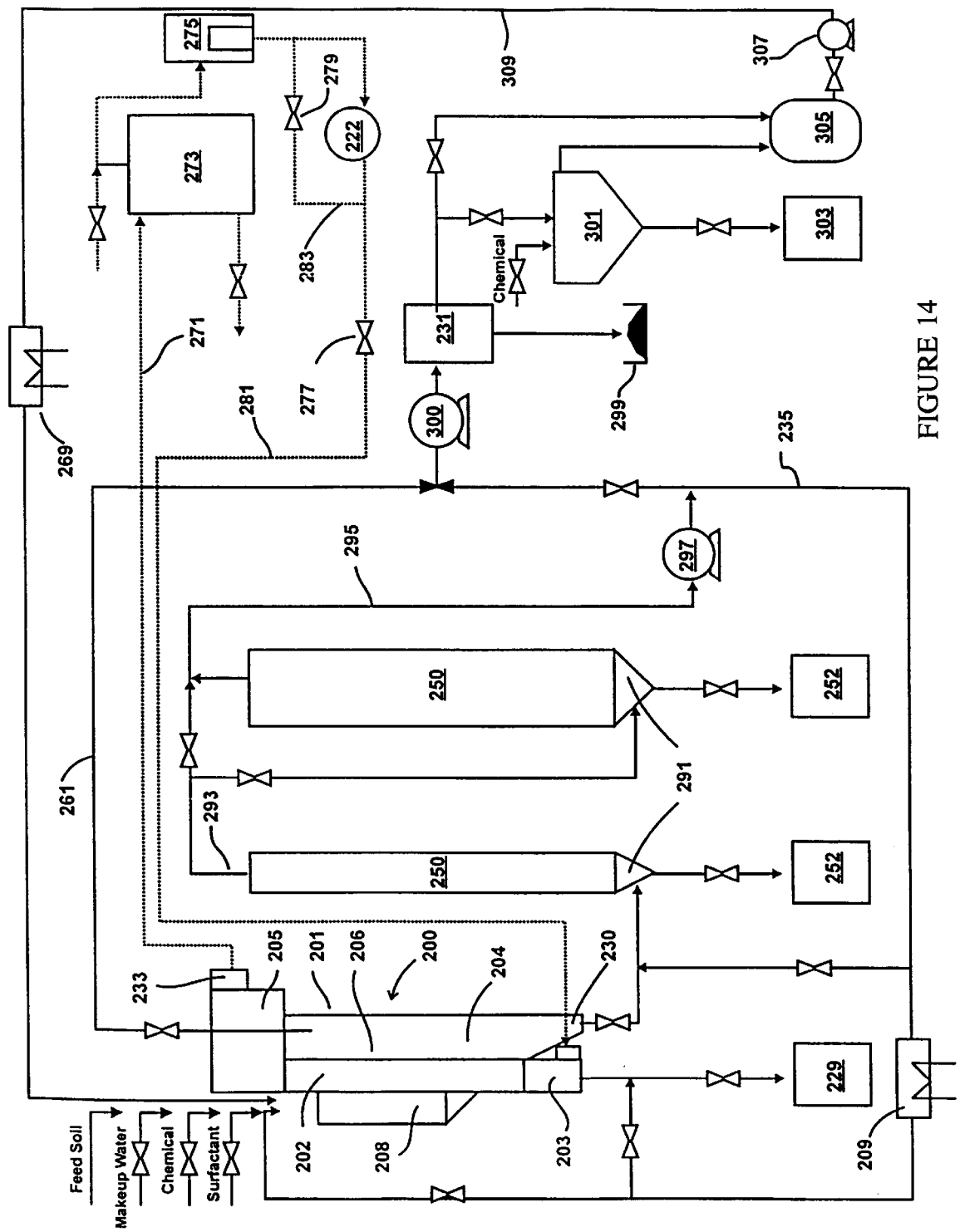
FIG. 14 is a schematic view of an alternative soil segregation and treatment process employing the reactor of FIG. 11.

Windbox 203 is provided for introducing pressurised air into the main body 201 of reactor 200. Windbox 203 is essentially an empty, wedge-shaped chamber having an air inlet 220 connected to a supply of pressurized air, such as a blower 222 (FIGS. 11 and 14). An air distribution plate 224 having a plurality of small apertures 226 is mounted at the upper end of windbox 203 (preferably sandwiched between mounting flanges connecting windbox 203 to main body 201). Windbox 203 is maintained at a positive pressure to ensure that streams of air pass through apertures 226 into mixing chamber 202 at a high velocity (e.g. 1.5 to 2.0 m/s) to create a turbulent mixture of raw soil and water. This ensures substantial interparticle scouring of the soil particles surfaces to assist in the abrasion and removal of adsorbed contaminants.

Figure 13:
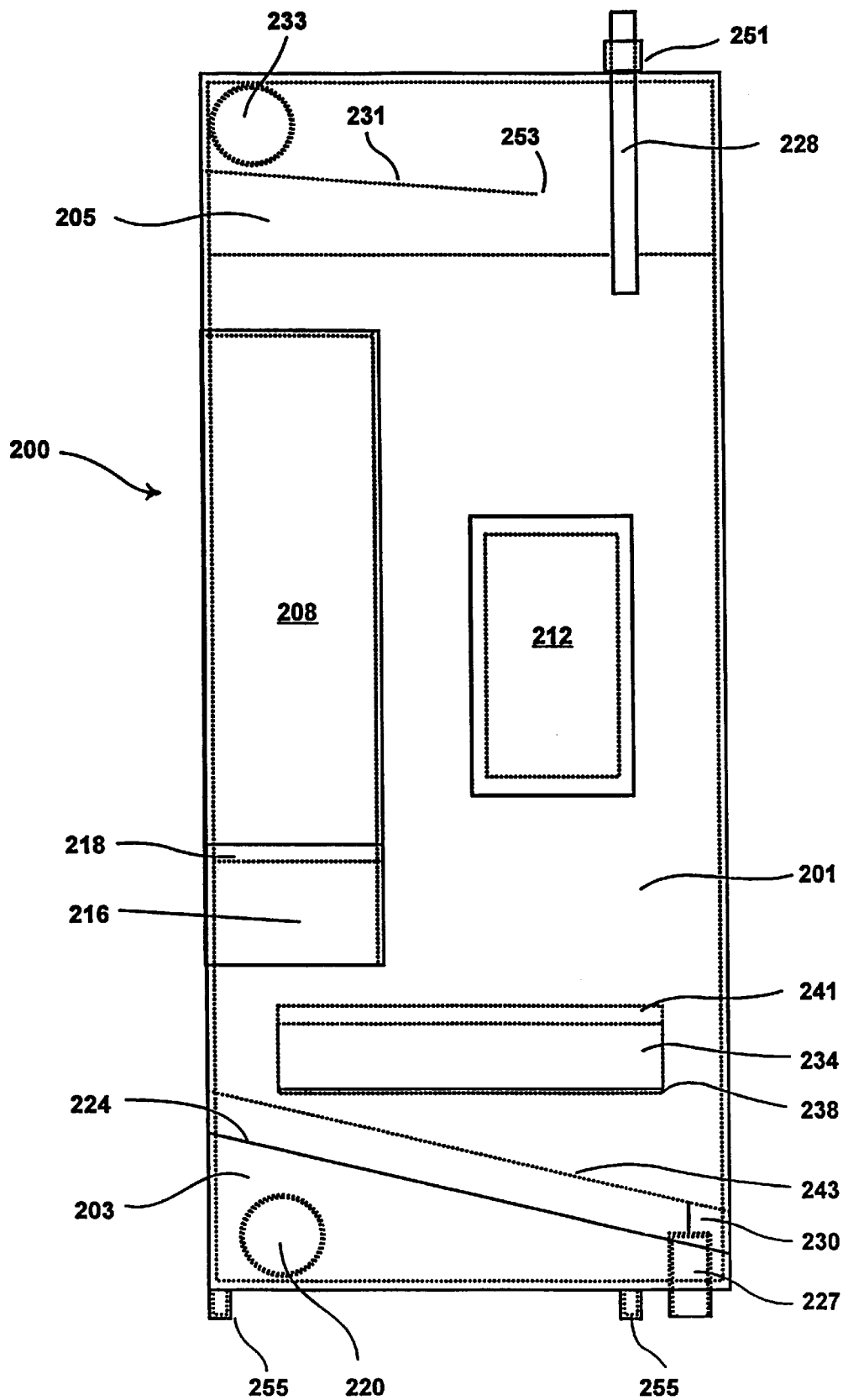
FIG. 13 is a front elevational view of the reactor of FIG. 11.

Windbox 203 also includes a cylindrical discharge port 227 extending vertically therethrough for withdrawing rocks and other relatively oversize debris from main body 201. An aperture is formed in distribution plate 224 to accommodate discharge port 227. Since windbox 203 is wedge-shaped, distribution plate 224 is inclined downwardly (preferably at an angle of approximately 14° relative to a horizontal plane) to direct any oversize debris toward discharge port 227 by gravitational forces (FIGS. 11 and 13). For example, if the feed soil to be treated is contaminated with heavy debris, such as lead shotgun shells, the debris will settle to the bottom of main body 201 against the upward flow of air. Such debris would be too large to pass through the apertures 226 formed in distribution plate 224 and would be gradually urged along the surface of plate 224 toward discharge port 227 by a combination of upwardly directed air flow and downwardly directed gravitational forces. Discharge port 227 is connected to a tank 229 for receiving the oversize debris (FIG. 14). This avoids subjecting such debris to downstream chemical treatment.

Since windbox 203 is wedge-shaped, there is larger static head, and hence a greater resistance to air flow, at its relatively narrow end than at its relatively wide end. In order to compensate for this differential static head, a larger number of apertures 226 are preferably formed in distribution plate 224 in the vicinity of discharge port 227 (FIG. 11). This ensures that the pressure drop along the length of distribution plate 224 is substantially constant.

Discharge port 227 may also optionally be used as a conduit for recirculating water into reactor 200 as described further below. In this embodiment, port 227 effectively functions as a secondary classifier as only large soil particles and oversize debris will settle into collection tank 229 against the upward flow of recirculated water.

As shown in FIGS. 11 and 13, windbox 203 may also include one or more drains 255 for draining any water or fine soil particles which pass through distribution plate apertures 226 into the interior of windbox 203. For example, if there is an interruption in air flow from blower 222, windbox 203 will fill with water and soil particles which must be drained before reuse of reactor 200. In normal operation, drains 255 are plugged.

The soil scoured within mixing chamber 202 is separated into fine and coarse fractions which pass over the upper end of baffle 206 into headbox 205 (which is releasably coupled to main body 201 with flange attachments). As discussed above, the coarse soil fraction tends to be relatively uncontaminated whereas the fine soil fraction typically comprises the majority of metal and petroleum hydrocarbon contaminants. The fine soil fraction is typically entrained in a buoyant foam. As indicated above, surfactants may be added to the feed soil slurry in trough 208 to promote foam generation.

As shown best in FIG. 13, headbox 205 includes a baffle 231 extending partway across reactor 200; an air outlet 233 located above baffle 231 for venting air laterally from reactor 200; and a slidably adjustable foam outlet pipe 228 located at an end of headbox 205 opposite air outlet 233. Foam outlet pipe 228 extends into the upper portion of downcomer chamber 204. Air outlet 233 is connected to a downstream air scrubber system and foam outlet pipe 228 is connected to a downstream secondary soil segregation system as shown in FIG. 14 and described further below.

In operation, the aerated soil slurry emerges from mixing chamber 202 at a high velocity and is directed against the undersurface of baffle 231. This causes the soil, water and air particles to lose some of their kinetic energy. The coarser soil particles are directed downwardly into chamber 204 whereas the finer soil particles entrained in foam are preferably withdrawn through outlet pipe 228. The vertical height of outlet pipe 228 may be slidably adjusted to correspond to the foam level in reactor 200, which may vary depending upon various parameters (such as the soil makeup and type or concentration of chemical reagents employed). If outlet pipe 228 is positioned too high, then very little foam will be withdrawn from reactor 200. On the other hand, if pipe 228 is positioned too low, then coarse, uncontaminated soil may be withdrawn through pipe 228 which will reduce the overall efficiency of the applicant's soil segregation process. Outlet pipe 228 may be releasably secured at the desired height to a sleeve 251 mounted on the upper surface of headbox 205.

The large volumes of air vented from reactor mixing chamber 202 pass around the free end 253 of baffle 231 and eventually into air outlet 233. Baffle 231 is positioned to minimize the entry of soil particles and water vapour into air outlet 233, preventing fouling of downstream equipment such as blower 222. As shown in FIG. 13, baffle 231 is inclined downwardly so that any soil particles or water vapour condensing on its upper surface will flow back toward the baffle free end 253 and into downcomer chamber 204.

As shown schematically in FIG. 14, the contaminated, fine soil fraction discharged through port 228 is conveyed through a conduit 261 by the action of pump 300. Pump 300 propels the fines through a pressure filter 231 to yield a solid cake of contaminated soil. The water filtrate may be treated as discussed further below to precipitate any contaminants and is then recirculated to reactor 200 through flow line 309.

A slurry of the coarse soil fraction, and any portion of the fine soil fraction which is not discharged through outlet port 228, descends within downcomer chamber 204 of reactor 200. This slurry is either recirculated back into mixing chamber 202 or is discharged through soil outlet 230 located at the lowermost end of reactor 200. As shown best in FIG. 12, the bottom portion of downcomer chamber 204 tapers rearwardly to funnel the soil slurry toward outlet 230. As shown in FIGS. 11 and 13, the longitudinal bottom surface 243 of downcomer chamber 204 is also inclined downwardly toward outlet 230 at approximately the same angle as distribution plate 224. Water jets may optionally be mounted on bottom surface 243 to help flush any settled soil particles toward outlet 230.

The soil can recirculate from downcomer chamber 204 back into mixing chamber 202 through a slot 232 located underneath or formed within baffle 206. As shown best in FIG. 12, baffle 206 includes an angled skirt 241 extending from the upper edge of slot 232 into chamber 204 to deflect air rising in mixing chamber 202, thereby preventing substantial airflow through slot 232. An adjustable gate 234 is provided for adjusting the size of the slot opening and hence the extent of soil recirculation. The position of gate 234 is manually controlled by a rod 236 which extends outwardly from a lower portion of chamber 204. When rod 236 is pushed inwardly or pulled outwardly, gate 234 swings about a hinge 238 between closed and open positions. Rod 236 (and hence gate 234) may be fixed in the desired position by tightening a nut 237.

When gate 234 is in the fully closed position, slot 232 is blocked completely and hence no portion of the soil slurry descending in downcomer chamber 204 is recirculated. A L-shaped skirt 239 is located at the free end of gate 234 which contacts baffle 206 in the fully closed position. This prevents the soil slurry from flowing into the space defined between gate 234 and baffle skirt 241 in the closed position. In the fully opened position, all or a substantial portion of the soil slurry is recirculated and the volume of material which is discharged through soil outlet port 230 is consequently reduced. Gate 234 may also be adjusted to intermediate positions between the fully opened and fully closed positions, as shown in FIG. 12.

As should be apparent to someone skilled in the art, gate 234 may be used to adjust the residence time of soil particles within reactor 200 during the first stage of the soil segregation process. For example, if contaminants are strongly adhered to soil particles, a larger residence time is desirable to ensure that the soil is adequately scoured before being subjected to further treatment. Typically soil particles are resident within turbulent mixing chamber 202 for approximately ten to fifteen seconds and are resident within downcomer chamber 204 for approximately 1 minute during each pass through reactor 200.

An outer panel 242 of downcomer chamber 204 includes a series of spaced ports 244 (FIG. 12). Ports 244 are provided for monitoring parameters of the soil slurry, such as temperature or pH, using suitable instruments. When not in use, ports 244 are closed. A hatch (not shown) may also be formed in a lower portion of panel 242 to allow the operator access to gate 234.

As should be apparent to someone skilled in the art, in further alternative embodiments of the invention the soil segregation subunit could comprise multiple fluidized bed reactors 200. For example, a single, centrally disposed soil trough could be disposed between two tandem, interconnected reactors 200 to increase the soil treatment capacity of the invention.

2.2 Air Scrubbing and Recirculation

As shown schematically in FIG. 14, air vented through outlet 233 of headbox 205 is conveyed through a conduit 271 to a moisture separator 273 where water vapour is removed. The vented air is then passed through a filter 275 to remove air-borne particulates. The scrubbed air is then recirculated to blower 222 for delivery to reactor windbox 203. In addition to not venting the process air to the environment, warm air recycle decreases the heating requirements of the process.

The air flow rate is controlled by blower 222 in combination with a pair of control valves 277 and 279. Valve 277 is located on the main air line 281 leading from blower 222 to windbox 203 of fluidized bed reactor 200. Valve 279 is located on a bypass air line 283 which branches off the main air line 281, as shown in FIG. 14. If control valve 277 is set fully open and valve 279 is closed, the air flow rate will be maximized. The flow rate may be modulated by opening valve 279 to divert some of the recirculated air through the bypass line 283. Further fine adjustments can be made by partially closing valve 277.

2.3 Secondary Soil Segregation

The coarse, relatively uncontaminated soil slurry which is discharged from soil outlet 230 proceeds to a secondary soil segregation process shown schematically in FIG. 14. More particularly, the soil slurry is preferably conveyed to a series of classifiers 250 of progressively larger cross-sectional area. Each classifier has a cone-shaped bottom funnel portion 291 having a lateral inlet for receiving the soil slurry. This results in a cyclonic motion of the soil slurry within the classifier 250 to promote soil segregation.

Each classifier 250 works in a manner generally similar to the hydrocyclone 62 and static water chamber 64 of the first embodiment of the invention illustrated in FIGS. 2 and 3. The smaller, potentially contaminated soil particles introduced into each classifier 250 rise with the upwelling flow of water whereas the larger, uncontaminated particles gradually settle to the bottom funnel portion 291 of the classifier 250 and are discharged into a collection tank 252.

Classifiers 250 are preferably glass tubes to permit operators to visually monitor soil segregation. If the soil slurry has been subjected to chemical treatment, then some leaching of contaminants may also occur while the soil particles are resident in classifiers 250.

With reference to FIG. 14, the smaller particles are elutriated out of the first classifier 250 and are passed through a conduit 293 to the inlet of the second classifier 250 in the series. Since the volumetric flow rate is constant and the second classifier 250 has a larger cross-sectional area, the fluid upflow velocity in the second classifier 250 is less than the first classifier 250. This ensures that a greater percentage of the relatively larger soil particles will settle to the bottom of the second classifier 250 for discharge to a second soil collection tank 252. The fines elutriated from the second classifier 250 could optionally be passed to a third classifier 250 in the series having a still greater cross-sectional area, and so on. Adjustable valves could also used for optionally diverting elutriated fines from any given classifier 250 directly to a downstream filter 231.

Although a series of classifiers 250 is desirable in this embodiment of the invention, a single classifier 250 would suffice. As should be apparent to someone skilled in the art, the fluid upflow velocity through the classifier(s) 250 may be adjusted depending upon the extent of segregation required.

After the relatively coarse soil particles have been passed through one or more of the classifiers 250, the relatively fine fraction elutriated therefrom is conveyed through a conduit 295 to pressure filter 231 by the action of pumps 297 and 300. Filter 231 yields a solid cake of contaminated soil which is discharged to a waste container 299. Any contaminants remaining in the aqueous phase may then be subjected to further treatment in a water treatment subunit described below. Treated water is recirculated back to reactor 200 through flow line 309 for reuse (FIG. 14). The recirculated water is passed through a heat exchanger 269 to raise its temperature to approximately 80° C.–90° C. before reintroducing the water into reactor 200 (FIG. 14).

In order to maintain flow rates at acceptable levels, filter 231 may be bypassed and process water withdrawn from classifiers 250, including fine soil particles, surfactants and any other chemical reagents, may be recirculated back to reactor 200 or classifiers 250 through flow line 235 (FIG. 14). This typically requires the closing of a valve upstream from filter 231 (for example, between pumps 297 and 300) and the opening of one or more valves on flow line 235. The process water recirculated through flow line 235 is also heated by a heat exchanger 269 before it is reintroduced into reactor 200 (either into soil inlet 214 of trough 208 or port 227 of windbox 203). Recycling the process water, including fine soil particles, from classifiers 250 to reactor 200 in this manner helps maintain the heat balance of the system in addition to maintaining an acceptable flow rate. Since the residence time of the fine soil particles in reactor 200 is increased, recirculation is also useful if the soil is being subjected to chemical leaching treatment.

One advantage of the alternative embodiment of the invention shown schematically in FIG. 14 is that the load on pumps 297 and 300 is relatively small since such pumps are located downstream of the primary and secondary soil segregation stages. In the first embodiment of the invention described above, solids pump 66 pumps the soil slurry withdrawn from reactor 10 to a downstream hydrocyclone 62, which places a considerable load on the pump.

2.4 Water Treatment

If the water filtrate from pressure filter 231 is significantly contaminated with petroleum hydrocarbons or heavy metals it may be subjected to further treatment by means of coagulation and/or high density sludge (HDS) processes respectively to remove contaminants before the water is recirculated (FIG. 14). The HDS treatment is described in detail above in connection with the first embodiment of the invention. Briefly, the filtrate is treated with lime in a reactor 301 and the resulting contaminated sludge is stored in a tank 303. The supernatant (i.e. treated water) overflows to a holding tank 305 and is then recirculated by pump 307 to reactor 200 through flow line 309.

Very little makeup water or air is required for the applicant's system to work effectively. The process does not generate significant quantities of solid wastes, contaminated liquid effluent or air emissions. Efficient recirculation of water, air and reagents makes the applicant's system attractive from both a cost-effective and environmentally sensitive point of view. Chemical and power costs approximate $20–$25 Cdn. per tonne of contaminated soil. Such costs compare favourably to the option of landfilling contaminated soil.

The solid cake of contaminated soil in container 299 and the sludge in tank 303 may be treated further as described above to extract any metals present. Alternatively, the contaminated material may be safely stored pending analysis and disposal by conventional means.

The concentrated contaminants in the soil cake typically constitute less than 5–20% of the mass of the originally contaminated soil. The extent of volume reduction depends upon the nature of both the soil and the contaminants as well as the soil/contaminants interactions. Soils which are largely clay or organic matter will demonstrate lower segregation while those soils comprising mainly sand will demonstrate higher segregation.

3.0 EXAMPLES

Bench and pilot scale studies of the applicant's soil treatment process have shown it to be an efficient method by which metals and petroleum hydrocarbons can be removed from contaminated soils. Results of test work relating to several different types of contaminated soils, using the first embodiment of the invention illustrated in FIGS. 1–10, are summarized in Table 1 below. The tests were conducted using soil slurries heated to approximately 80° C. In most cases the residence time of the soil particles in the fluidized bed reactor 10 was 5 minutes.

TABLE 1

Segregation of Metal and Hydrocarbon Contaminants From Soil

| pH | RESIDENCE TIME (MIN.) | CONTAMINANT | CONCENTRATION UNITS | FEED SOIL CONC. | SEGREGATED SOIL CONC. |
|---|---|---|---|---|---|
| 1-11 | 5 | Diesel | ug TEH*/g soil | 41,000 | 170 |
| 1-11 | 5 | Kerosene | ug TEH/g soil | 1,340 | 20 |
| 11 | 5 | Motor Oil | ug TEH/g soil | 213,170 | 1,350 |
| 11 | 5 | PAH | ug TEH/g soil | 1,620 | 80 |
| 11 | 5 | Creosote | ug TEH/g soil | 44,500 | 4,780 |
| 13 | 30 | Arsenic | ug/g soil | 36,200 | 740 |
| 1 | 5 | Barium | ug/g soil | 2,015 | 750 |
| 1 | 5 | Cadmium | ug/g soil | 12.0 | 1.5 |
| 1 | 5 | Chromium | ug/g soil | 59 | 38 |
| 1 | 5 | Copper | ug/g soil | 202 | 114 |
| 1 | 5 | Manganese | ug/g soil | 1,875 | 525 |
| 1 | 5 | Nickel | ug/g soil | 133 | 48 |
| 13 | 30 | Lead | ug/g soil | 1,950 | 550 |
| 1 | 5 | Strontium | ug/g soil | 1,538 | 269 |
| 1 | 5 | Zinc | ug/g soil | 6,525 | 802 |

*TEH = total extractable hydrocarbons

The scope of the invention should be construed in accordance with the substance defined by the following claims.

What is claimed is:

1. An apparatus for treating contaminated soil comprising a reactor vessel (10, 200) for holding a volume of water, said reactor vessel (10, 200) having at least one first chamber (12, 202) and a second chamber (14, 204); (a) a baffle (16, 206) partially separating said first (12, 202) and second (14, 204) chambers, wherein said chambers (12, 14; 202, 204) are in fluid communication; (b) a soil conveyor for conveying a supply of said contaminated soil to said first chamber (12, 202); and (c) gas supply means for directing a supply of gas into said first chamber (12, 202), characterized in that:

said gas is directed into said first chamber (12,202) at a velocity sufficient to create a turbulent mixture of said soil and water in said first chamber (12, 202) thereby physically scouring the surfaces of said soil by interparticle abrasion and liquid shear to effect separation of said soil into a substantially small particle size first fraction and a substantially large particle size second fraction; and wherein said reactor vessel (10,200) further comprises a first outlet (50, 230) located in a lower portion of said second chamber for withdrawing a slurry comprising at least said second soil fraction from said reactor vessel (10, 200).

2. The apparatus of claim 1, further comprising a second outlet (32, 228) located in an upper portion of said reactor vessel (10, 200) for withdrawing said first soil fraction from said reactor vessel (10, 200).

3. The apparatus of claim 2, wherein said second outlet (32, 228) is located above said second chamber (14, 204).

4. The apparatus of claim 3, wherein said gas supply means is located in a lower portion of said reactor vessel (10, 200) and directs said gas upwardly into said first chamber (12, 202).

5. The apparatus of claims 4, further comprising a gas outlet (233) located in an upper portion of said reactor vessel (200) for receiving gas vented from said first chamber (12, 202).

6. he apparatus of claim 5, further comprising a baffle (231) extending part-way across said reactor (200) between said first chamber (202) and said gas outlet (233).

7. The apparatus of claim 6, wherein said baffle (231) is inclined toward said second chamber (204).

8. The apparatus of claim 4, wherein said gas supply means comprises a nozzle (51) connectable to a supply of pressurized gas (55).

9. The apparatus of claim 4, wherein said soil conveyor comprises a trough (18, 208) which terminates proximate said lower portion of said first chamber (202).

10. The apparatus of claim 4, wherein said gas supply means comprises:
  (a) a windbox (203) having an inlet (220) connectable to a supply of pressurized gas (222);
  (b) a distribution plate (224) comprising the upper surface of said windbox (203), said distribution plate having a pluraiity of apertures (996) formed therein; and
  (c) a discharge port (227) extending vertically through said windbox into said first chamber (202).

11. The apparatus of claim 10, wherein said windbox (203) is generally wedge-shaped and wherein said distribution plate (224) is inclined downwardly toward said discharge port (227).

12. The apparatus of claim 11, wherein said apertures (226) are distributed in relatively larger numbers in the vicinity of said discharge port (227) such that the gas pressure drop along the length of said distribution plate (224) is substantially constant.

13. The apparatus of claim 2, wherein said second outlet (32, 228) comprises a conduit which is slidably adjustable relative to said reactor vessel (10, 200) between different vertical positions.

14. The apparatus of claim 2, wherein said second outlet (32) comprises a plurality of closable outlet ports (32) spaced at different distances from said first chamber (12).

15. The apparatus of claim 14, wherein said outlet ports (32) are located in an upper portion of said reactor vessel (10).

16. The apparatus of claim 15, further comprising an elongated collection tray (24) on an external surface of said reactor vessel (10) for receiving said first soil fraction passing through said outlet ports (32).

17. The apparatus of claim 2, wherein said apparatus further comprises a dewatering apparatus connected to said second outlet (32, 228) for removing water and any foaming reagent from said first soil fraction and recycling said water and foaming reagent to said reactor vessel (10, 200), wherein said dewatering apparatus yields a solid cake of said substantially small soil particles.

18. The apparatus of claim 17, further comprising a water treatment subunit connected to said dewatering apparatus for precipitating any contaminants present in said water prior to recirculating said water to said reactor vessel (10, 200).

19. The apparatus of claim 1, wherein upper and lower portions of said first (12, 202) and second (14, 204) chambers are in fluid communication to permit circulation of said mixture of soil and water around said baffle (16, 206).

20. The apparatus of claim 1, further comprising a slot (232) formed in a lower portion of said baffle (206) to permit circulation of said mixture of soil and water from said second chamber (204) to said first chamber (202).

21. The apparatus of claim 20, further comprising an adjustable gate (234) for adjusting the size of opening of said slot (232).

22. The apparatus of claim 21, wherein said gate (234) is pivotally coupled to said baffle (206).

23. The apparatus of claim 22, wherein said baffle (206) further comprises a skirt (241) extending from an upper edge of said slot (232) into said second chamber (204) for deflecting said pressurized gas in said first chamber (202) away from said slot (232).

24. The apparatus of claim 23, wherein said gate (234) further comprises an L-shaped skirt (239) at its free end which contacts said baffle (206) when said gate (234) is adjusted to a (fully closed position.

25. The apparatus of claim 1, wherein a lower portion of said second chamber (204) is funnel-shaped to direct said mixture of soil and water toward said first outlet (230).

26. The apparatus of claim 1, wherein said first chamber (12, 202) has a substantially smaller volume than said second chamber (14, 204).

27. The apparatus of claim 1, further comprising soil segregation means connected to said first outlet (50, 230) of said reactor vessel (10, 200) for separating said second soil fraction from water and any relatively small soil particles present in said slurry and continuously recycling said water back to said reactor vessel (10, 200).

28. The apparatus of claim 27, wherein said soil segregation means comprises a hydrocylone (62).

29. The apparatus of claim 28, wherein said soil segregation means further comprising a static column (64) connected to said hydrocyclone (62), wherein relatively large soil particles discharged from said hydrocylone (62) settle in said static column (64) against an upward flow of percolating water, and wherein said relatively small soil particles discharged from said hydrocylone (62) are withdrawn from an upper portion of said static column (64) and are recirculated to said reactor vessel (10).

30. The apparatus of claim 27, wherein said soil segregation means comprises at least one elongated classifier (250), wherein said relatively large soil particles settle in said classifier (250) against an upward flow of water, and wherein said relatively small soil particles are elutriated from an upper portion of said classifier (250).

31. The apparatus as defined in claim 30, wherein said soil segregation means comprises a series of classifiers (250) of progressively larger cross-sectional area, wherein the fluid upflow velocity in each classifier (250) is greater than any downstream classifiers (250) in the series.

32. The apparatus as defined in claim 1, wherein said slurry comprises said first and second soil fractions and wherein said apparatus further comprises a classifier (250) connected to said first outlet for segregating said soil fractions.

33. The method of claim 32, further comprising the step of recycling said first soil fraction to said reactor vessel (10).

34. A method for treating soil containing contaminants, said method comprising the steps of:
(a) introducing said soil into a reactor vessel (10, 200) containing a volume of water;
(b) introducing a supply of pressurized gas into said reactor vessel (10, 200) to create a turbulent mixture of said soil and water;
characterized in that:
said gas is introduced into said reactor vessel at a velocity sufficient to scour said soil particles by interparticle abrasion and liquid shear thereby effecting separation of said soil into a first fraction containing substantially small size contaminated soil particles and a second fraction comprising substantially large size uncontaminated soil particles, and wherein said method further comprises the steps of:
(c) withdrawing a slurry comprising at least said second fraction from a lower portion of said reactor vessel (10, 200); and
(d) separating any of said small size soil particles present in said slurry from said second fraction in a classifier in fluid connection with said reactor lower portion.

35. The method of 34, wherein said reactor vessel (10, 200) comprises a relatively small volume first chamber (12, 202) and a relatively large volume second chamber (14, 204) separated by a baffle (16, 206), and wherein said method further comprises the step of circulating said mixture of soil and water between said first and second chambers (12, 14; 202, 204) multiple times before withdrawing said slurry from said reactor (10, 200).

36. The method of claim 34, further comprising the step of dispersing a surfactant reagent into said reactor vessel (10, 200) to generate a foam comprising said first fraction.

37. The method of claim 34, further comprising the step of dispersing a reagent into said reactor vessel (10, 200) to alter the pH of said mixture of soil and water.

38. The method of claim 34, further comprising the step of dewatering said slurry and recirculating the resulting water filtrate to said reactor (10, 200).

39. The method of claim 34, further comprising the step of capturing gas vented from said reactor (10, 200) and recycling said gas to said reactor vessel (10, 200).

40. The method of claim 34, wherein said soil is introduced into said reactor vessel (10, 200) continuously and said first fraction and said slurry are withdrawn from said reactor vessel (10, 200) continuously.

* * * * *